US008717687B2

(12) United States Patent
Hsu et al.

(10) Patent No.: US 8,717,687 B2
(45) Date of Patent: May 6, 2014

(54) IMAGE LENS ASSEMBLY

(75) Inventors: Chih-Wen Hsu, Taichung (TW);
Tsung-Han Tsai, Taichung (TW);
Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 98 days.

(21) Appl. No.: 13/479,250

(22) Filed: May 23, 2012

(65) Prior Publication Data

US 2013/0050847 A1    Feb. 28, 2013

(30) Foreign Application Priority Data

Aug. 26, 2011  (TW) .............................. 100130738 A

(51) Int. Cl.
*G02B 9/60* (2006.01)
*G02B 13/18* (2006.01)

(52) U.S. Cl.
CPC ....................................... *G02B 9/60* (2013.01)
USPC ............................................ 359/764; 359/714

(58) Field of Classification Search
USPC .......................................... 359/714, 753, 764
See application file for complete search history.

(56) References Cited

U.S. PATENT DOCUMENTS

| 7,355,801 B2 | 4/2008 | Chen et al. |
| 2011/0013069 A1* | 1/2011 | Chen ............................. 348/335 |
| 2011/0273611 A1* | 11/2011 | Matsusaka et al. ........... 348/345 |

* cited by examiner

*Primary Examiner* — William Choi
(74) *Attorney, Agent, or Firm* — CKC & Partners Co., Ltd.

(57) ABSTRACT

An image lens assembly includes, in order from an object side to an image side, the first lens element with positive refractive power having a convex object-side surface, the second lens element with negative refractive power, the third lens element with refractive power, the fourth lens element with positive refractive power made of plastic material, the fifth lens element with negative refractive power made of plastic material. At least one surface of the third lens element, the fourth lens element and the fifth lens element are aspheric.

29 Claims, 26 Drawing Sheets

IMAGE LENS ASSEMBLY

RELATED APPLICATIONS

The application claims priority to Taiwan Application Serial Number 100130738, filed Aug. 26, 2011, which is herein incorporated by reference.

BACKGROUND

1. Technical Field

The present invention relates to an image lens assembly. More particularly, the present invention relates to a compact image lens assembly applicable to electronic products.

2. Description of Related Art

In recent years, with the popularity of mobile products with camera functionalities, the demand for miniaturizing an image lens assembly is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact image lens assemblies have gradually evolved toward the field of higher megapixels, there is an increasing demand for compact image lens assemblies featuring better image quality.

A conventional compact image lens assembly employed in a portable electronic product mainly adopts a four-element lens structure. Due to the popularity of mobile products with high specification, such as Smart Phones and PDAs (Personal Digital Assistants), the pixel and image-quality requirements of the compact image lens assembly have increased rapidly. However, the conventional four-piece lens structure cannot satisfy the requirements of the compact image lens assembly. Furthermore, the trend in modern electronics is developed toward increasingly higher performance and compact size. Therefore, a need exists in the art for providing an image lens assembly for use in a mobile electronic product that has excellent imaging quality without too long total track length.

SUMMARY

According to one aspect of the present disclosure, an image lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power, wherein at least one surface of an object-side surface and an image-side surface of the third lens element is aspheric. The fourth lens element with positive refractive power is made of plastic material, wherein at least one surface of an object-side surface and an image-side surface of the fourth lens element is aspheric. The fifth lens element with negative refractive power is made of plastic material, wherein at least one surface of an object-side surface and an image-side surface of the fifth lens element is aspheric. A focal length of the image lens assembly is f, and a diameter of an entrance pupil of the image lens assembly is EPD, the following relationship is satisfied:

$$1.4 < f/EPD \leq 1.9.$$

According to another aspect of the present disclosure, an image capturing lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power, wherein at least one surface of an object-side surface and an image-side surface of the third lens element is aspheric. The fourth lens element with refractive power is made of plastic material, wherein at least one surface of an object-side surface and an image-side surface of the fourth lens element is aspheric. The fifth lens element with refractive power is made of plastic material, wherein at least one surface of an object-side surface and an image-side surface of the fifth lens element is aspheric. A diameter of an entrance pupil of the image lens assembly is EPD, and a central thickness of the second lens element is CT2, the following relationship is satisfied:

$$6.0 < EPD/CT2 < 9.5.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
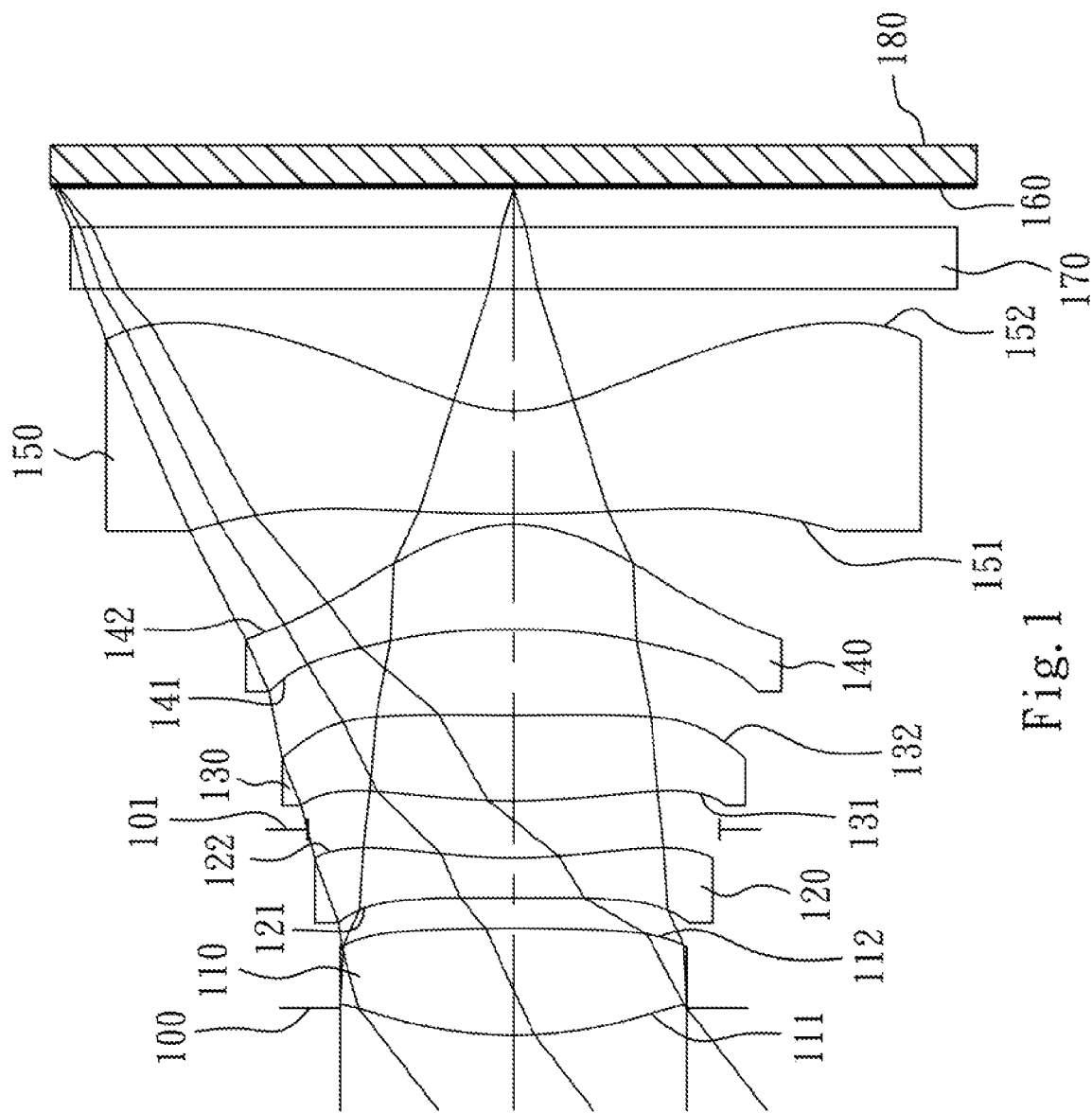
FIG. 1 is a schematic view of an image lens assembly according to the 1st embodiment of the present disclosure.

An image lens assembly includes, in order from an object side to an image side, a first lens element, a second lens element, a third lens element, a fourth lens element and a fifth lens element. The image lens assembly further includes a stop and an image sensor, wherein the image sensor is located on an image plane.

The first lens element with positive refractive power provides partial refractive power for reducing the total track length of the image lens assembly. The first lens element has a convex object-side surface for further reducing the total track length of the image lens assembly.

The second lens element with negative refractive power can correct the aberration generated from the first lens element with positive refractive power. The second lens element has a concave image-side surface for further correcting the aberration of the image lens assembly.

The third lens element with positive refractive power has a convex object-side surface, so that the sensitivity of the image lens assembly can be reduced by distributing the positive refractive power of the first lens element. Moreover, at least one surface of the third lens element is aspheric, and the third lens element has at least one inflection point formed on at least one of the object-side surface and the image-side surface thereof.

The fourth lens element with positive refractive power provides main refractive power for reducing the total track length of the image lens assembly. The fourth lens element is made of plastic material. Moreover, the fourth lens element has at least one inflection point formed on at least one of the object-side surface and the image-side surface thereof, so that the positive refractive power of the fourth lens element decreases when moving away from the optical axis. Therefore, the incident angle of the off-axis field on the image sensor can be effectively minimized and the aberration can be corrected as well. The fourth lens element has a concave object-side surface and a convex image-side surface, so that the astigmatism and the high order aberration of the image lens assembly can be corrected. Furthermore, at least one surface of to the fourth lens element is aspheric.

The fifth lens element with negative refractive power can correct the Petzval Sum of the image lens assembly for smoothing the peripheral area of the image. The fifth lens element has at least one inflection point formed on at least one surface thereof, so that the negative refractive power of the fifth lens element decreases when moving away from the optical axis. Therefore, the incident angle of the off-axis field on the image sensor can be effectively minimized and the aberration can be corrected as well. The fifth lens element has a concave image-side surface, so that the principal point of the image lens assembly can be positioned away from the image plane, and the total track length of the image lens assembly can be reduced so as to maintain the compact size of the image lens assembly.

A focal length of the image lens assembly is f, and a diameter of the entrance pupil of the image lens assembly is EPD, the following relationship is satisfied: $1.4 < f/EPD \leq 1.9$. Therefore, the image lens assembly can retain better image quality under insufficient lighting condition, and can obtain shallow depth of field for projecting the photography subject.

f and EPD can further satisfy the following relationship: $1.4 < f/EPD \leq 1.85$.

Moreover, f and EPD satisfy the following relationship: $1.4 < f/EPD \leq 1.75$.

The diameter of the entrance pupil of the image lens assembly is EPD, and the central thickness of the second lens element is CT2, the following relationship is satisfied: $6.0 < EPD/CT2 < 9.5$. Therefore, the favorable amount of light entry can be well maintained.

An axial distance between the stop and the image plane is SL, and an axial distance between the object-side surface of the first lens element and the image plane is TTL, the following relationship is satisfied: $0.76 < SL/TTL < 1.1$. Therefore, the image lens assembly can have a good balance between the telecentric and wide-angle characteristics, as well as a desirable total track length of the image capturing lens assembly.

The central thickness of the second lens element is CT2, and a central thickness of the third lens element is CT3, the following relationship is satisfied: $0.1 < CT2/CT3 < 0.76$. Therefore, the fabrication of the image lens assembly would be easier with higher yield rate.

The Abbe number of the first lens element is V1, and the Abbe number of the second lens element is V2, the following relationship is satisfied: $28 < V1 - V2 < 45$. Therefore, the chromatic aberration of the image lens assembly can be corrected.

A maximum image height of the image lens assembly is ImgH, and an axial distance between the object-side surface of the first lens element and the image plane is TTL, the following relationships are satisfied: $TTL/ImgH < 2.0$. Therefore, the total track length of the image lens assembly can be reduced so as to maintain the compact size of the image lens assembly for portable electronic products.

A maximal field of view of the image lens assembly is FOV, the following relationship is satisfied: $70 \text{ (degree)} < FOV < 86 \text{ (degree)}$. Therefore, the distortion of image can be avoided by maintain the suitable field of view.

According to the image lens assembly of the present disclosure, the lens elements thereof can be made of plastic material or glass. When the lens elements are made of glass material, the allocation of the refractive power of the image lens assembly may be more flexible and easier to design. When the lens elements are made of plastic material, the cost of manufacture can be effectively reduced. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the image lens assembly can also be reduced.

According to the image lens assembly of the present disclosure, when the lens element has a convex surface, it indicates that the paraxial region of the surface is convex; and when the lens element has a concave surface, it indicates that the paraxial region of the surface is concave.

According to the image lens assembly of the present disclosure, the image lens assembly can include at least one stop, such as a glare stop or a field stop, for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the optical designer, in order to achieve the desirable optical features or higher image quality produced from the optical system.

According to the above description of the present disclosure, the following 1st-13th specific embodiments are provided for further explanation.

1st Embodiment

Figure 2:
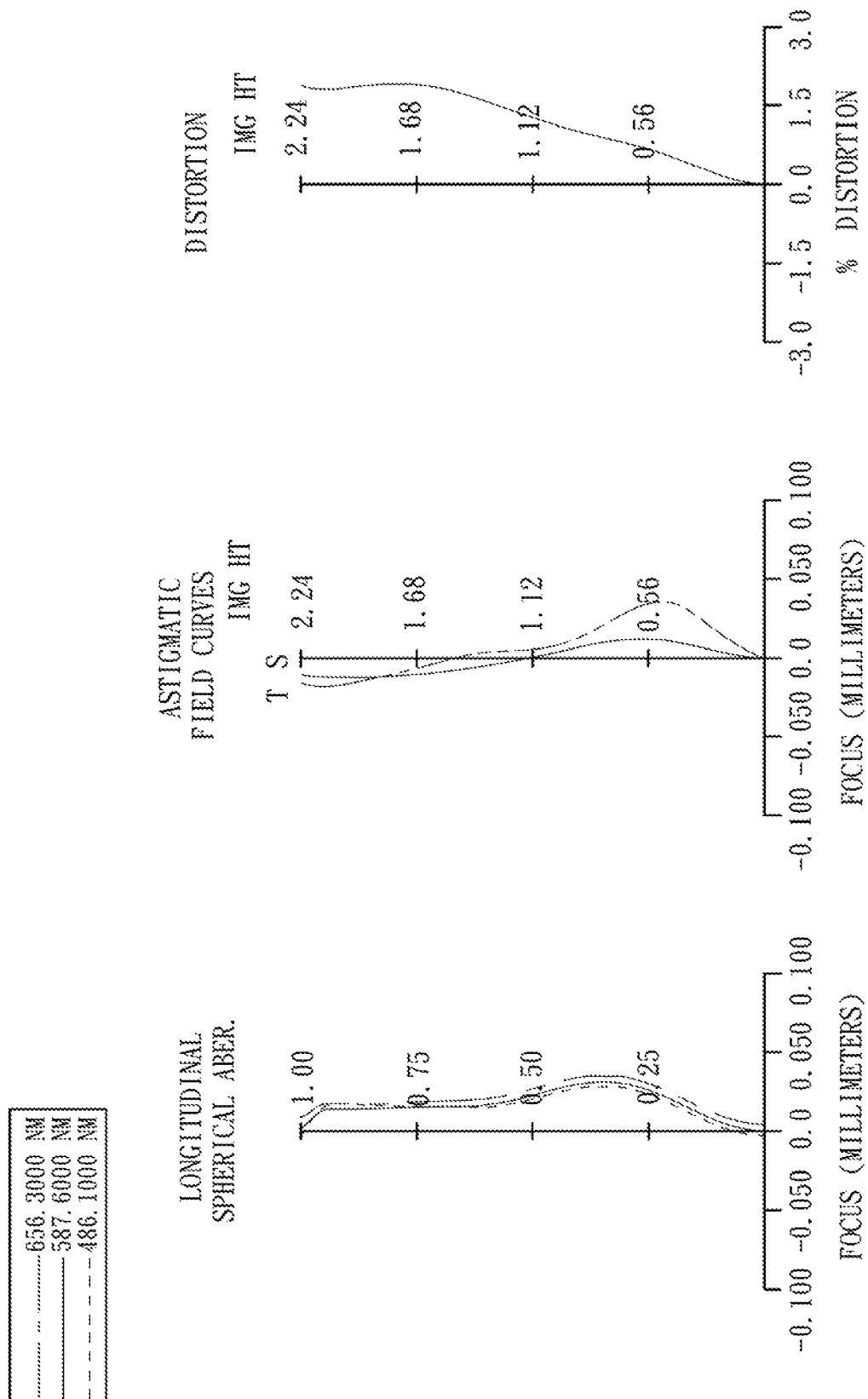
FIG. 2 shows spherical aberration curves, astigmatic field curves and a distortion curve of the image lens assembly according to the 1st embodiment.

FIG. 1 is a schematic view of an image lens assembly according to the 1st embodiment of the present disclosure. FIG. 2 shows spherical aberration curves, astigmatic field curves and a distortion curve of the image lens assembly according to the 1st embodiment. In FIG. 1, the image lens assembly includes, in order from an object side to an image side, an aperture stop 100, the first lens element 110, the second lens element 120, a stop 101, the third lens element 130, the fourth lens element 140, the fifth lens element 150, an IR (infrared) cut filter 170, an image plane 160 and an image sensor 180.

The first lens element 110 with positive refractive power has a convex object-side surface 111 and a convex image-side surface 112, and is made of plastic material. The object-side surface 111 and the image-side surface 112 of the first lens element 110 are aspheric.

The second lens element 120 with negative refractive power has a convex object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a concave image-side surface 132, and is made of plastic material. The object-side surface 131 and the image-side surface 132 of the third lens element 130 are aspheric. Moreover, the third lens element 130 has inflection points formed on the object-side surface 131 and the image-side surface 132 thereof.

The fourth lens element 140 with positive refractive power has a concave object-side surface 141 and a convex image-side surface 142, and is made of plastic material. The object-side surface 141 and the image-side surface 142 of the fourth lens element 140 are aspheric. Moreover, the fourth lens element 140 has inflection points formed on the image-side surface 142 thereof. Therefore, the positive refractive power of the fourth lens element 140 decreases when moving away from the optical axis.

The fifth lens element 150 with negative refractive power has a convex object-side surface 151 and a concave image-side surface 152, and is made of plastic material. The object-side surface 151 and the image-side surface 152 of the fifth lens element 150 are aspheric. Moreover, the fifth lens element 150 has inflection points formed on the object-side surface 151 and the image-side surface 152 thereof. Therefore, the negative refractive power of the fifth lens element 150 decreases when moving away from the optical axis.

The IR cut filter 170 is made of glass and located between the fifth lens element 150 and the image plane 160, and will not affect the focal length of the image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the distance of a point on the aspheric surface spaced at a distance Y from the optical axis relative to the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the image lens assembly according to the 1st embodiment, when a focal length of the image lens assembly is f, a maximal field of view of the image lens assembly is FOV, these parameters have the following values:

f=2.80 mm; and

FOV=76.0 degrees.

In the image lens assembly according to the 1st embodiment, when the Abbe number of the first lens element 110 is V1, and the Abbe number of the second lens element 120 is V2, the following relationship is satisfied:

$V1-V2=34.5$

In the image lens assembly according to the 1st embodiment, when the focal length of the image lens assembly is f, and a diameter of the entrance pupil of the image lens assembly is EPD, the following relationship is satisfied:

$f/EPD=1.65.$

In the image lens assembly according to the 1st embodiment, when the diameter of the entrance pupil of the image lens assembly is EPD, a central thickness of the second lens element 120 is CT2, the following relationship is satisfied:

$EPD/CT2=8.50.$

In the image lens assembly according to the 1st embodiment, when the central thickness of the second lens element 120 is CT2, and a central thickness of the third lens element 130 is CT3, the following relationship is satisfied:

$CT2/CT3=0.47.$

In the image lens assembly according to the 1st embodiment, an axial distance between the stop 100 and an image plane 160 is SL, an axial distance between the object-side surface 111 of the first lens element 110 and the image plane 160 is TTL, and a maximum image height of the image lens assembly is ImgH which here is a half of the diagonal length of the photosensitive area of the image sensor 180 on the image plane 160, the following relationship is satisfied:

$SL/TTL=0.97$; and $TTL/ImgH=1.81.$

The detailed optical data of the 1st embodiment are shown in Table 1 and the aspheric surface data are shown in Table 2 below.

TABLE 1

1st Embodiment
f = 2.80 mm, Fno = 1.65, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.133 | | | | |
| 2 | Lens 1 | 2.098860 (ASP) | 0.524 | Plastic | 1.544 | 55.9 | 3.38 |
| 3 | | −13.408200 (ASP) | 0.148 | | | | |
| 4 | Lens 2 | 20.054600 (ASP) | 0.200 | Plastic | 1.650 | 21.4 | −4.70 |
| 5 | | 2.641730 (ASP) | 0.137 | | | | |
| 6 | Stop | Plano | 0.140 | | | | |
| 7 | Lens 3 | 3.287700 (ASP) | 0.423 | Plastic | 1.544 | 55.9 | 7.75 |
| 8 | | 14.216100 (ASP) | 0.417 | | | | |
| 9 | Lens 4 | −5.032200 (ASP) | 0.515 | Plastic | 1.544 | 55.9 | 1.55 |
| 10 | | −0.746550 (ASP) | 0.050 | | | | |
| 11 | Lens 5 | 9.574000 (ASP) | 0.507 | Plastic | 1.535 | 56.3 | −1.53 |
| 12 | | 0.738940 (ASP) | 0.600 | | | | |
| 13 | IR-Filter | Plano | 0.300 | Glass | 1.517 | 64.2 | — |
| 14 | | Plano | 0.203 | | | | |
| 15 | Image | Plano | — | | | | |

Note:
Reference wavelength (d-line) is 587.6 nm.
Effective radius of Surface 6 is 1.01 mm.

TABLE 2

Aspheric Coefficients

| Surface # | 2 | 3 | 4 | 5 | 7 |
|---|---|---|---|---|---|
| k = | 7.02567E−01 | −1.00000E+00 | −9.90000E+01 | −1.12918E+01 | −9.00000E+01 |
| A4 = | −3.81991E−02 | −2.90601E−02 | −2.27976E−01 | −1.75541E−01 | 1.04463E−01 |
| A6 = | 1.34996E−01 | −1.09782E−01 | 1.69501E−01 | 2.15663E−01 | −2.90306E−01 |
| A8 = | −4.83029E−01 | 1.60527E−01 | −4.65610E−01 | −3.39725E−01 | 2.02571E−01 |
| A10 = | 6.21826E−01 | −5.45986E−01 | 8.67244E−01 | 2.02053E−01 | −2.17920E−02 |
| A12 = | −3.10456E−01 | 7.49167E−01 | −1.49750E+00 | −4.34034E−02 | −8.47183E−02 |
| A14 = | −1.02488E−01 | −8.61140E−01 | 9.04231E−01 | −5.12935E−02 | −1.33587E−02 |
| A16 = | 6.28554E−04 | 4.67258E−01 | 4.66018E−03 | 2.93487E−02 | 3.16407E−02 |

| Surface # | 8 | 9 | 10 | 11 | 12 |
|---|---|---|---|---|---|
| k = | −1.00000E+00 | 2.75272E+00 | −3.65416E+00 | −1.00000E+00 | −4.59421E+00 |
| A4 = | −2.06682E−01 | −3.06863E−01 | −2.15319E−01 | 1.49960E−02 | −6.42424E−02 |
| A6 = | 4.51433E−01 | 5.97863E−01 | 2.35020E−01 | −8.32923E−02 | 2.44421E−02 |
| A8 = | −7.90409E−01 | −5.18581E−01 | −2.63660E−02 | 4.87555E−02 | −8.92987E−03 |
| A10 = | 5.21742E−01 | 2.06405E−01 | −3.77783E−02 | −1.36623E−02 | 2.19155E−03 |
| A12 = | −3.53112E−03 | −3.74158E−02 | 6.61939E−03 | 3.29401E−03 | −3.36898E−04 |
| A14 = | −1.95163E−01 | −1.28197E−02 | 4.49075E−04 | −9.80409E−04 | 2.21205E−05 |
| A16 = | 8.00230E−02 | 7.75127E−03 | 7.33084E−04 | 1.44766E−04 | |

In Table 1, the curvature radius, the thickness and the focal length are shown in millimeters (mm). Surface numbers 0-15 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
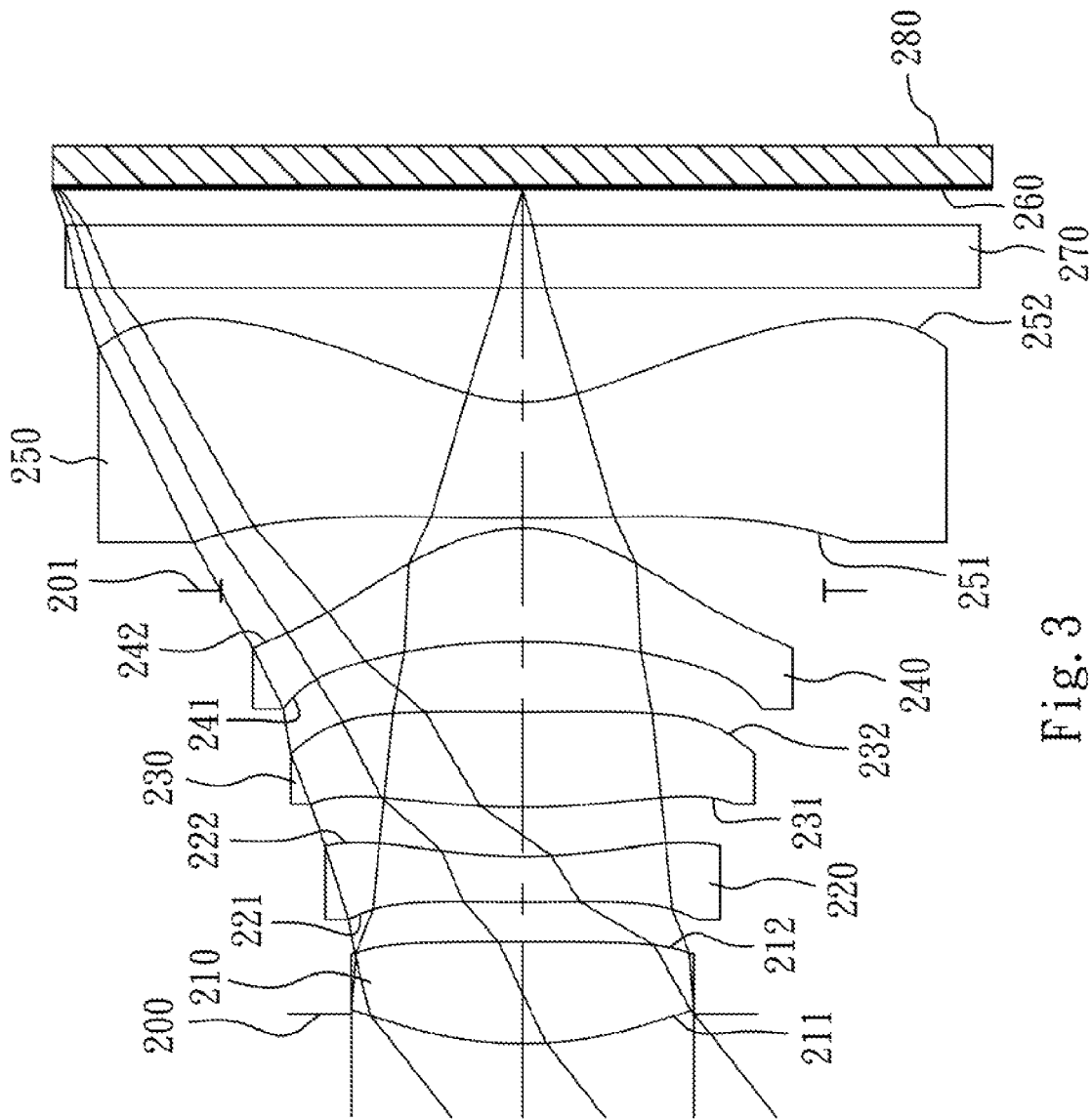
FIG. 3 is a schematic view of an image lens assembly according to the 2nd embodiment of the present disclosure.
Figure 4:
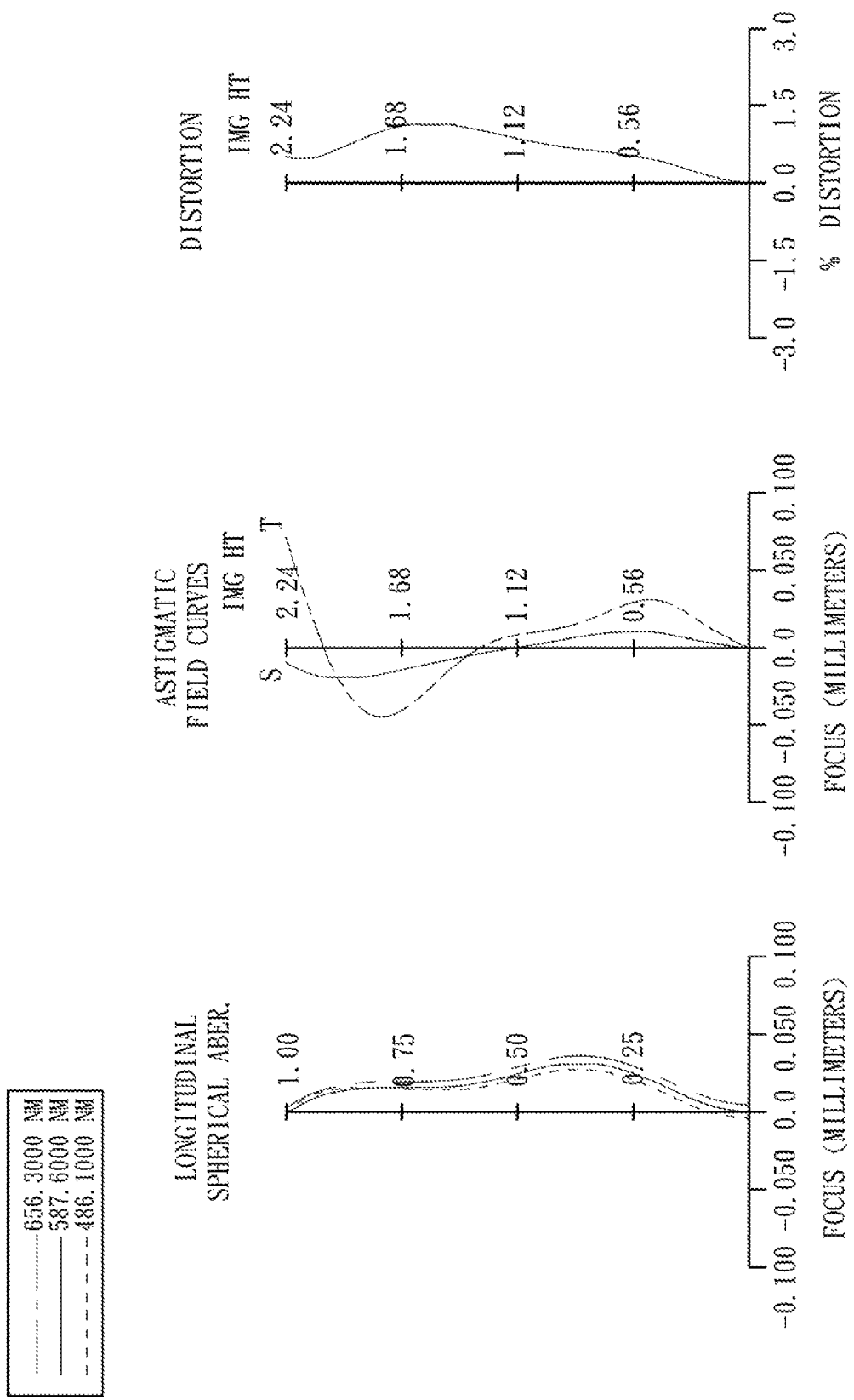
FIG. 4 shows spherical aberration curves, astigmatic field curves and a distortion curve of the image lens assembly according to the 2nd embodiment.

FIG. 3 is a schematic view of an image lens assembly according to the 2nd embodiment of the present disclosure. FIG. 4 shows spherical aberration curves, astigmatic field curves and a distortion curve of the image lens assembly according to the 2nd embodiment. In FIG. 3, the image lens assembly includes, in order from an object side to an image side, an aperture stop 200, the first lens element 210, the second lens element 220, the third lens element 230, the fourth lens element 240, a stop 201, the fifth lens element 250, an IR cut filter 270, an image plane 260 and an image sensor 280.

The first lens element 210 with positive refractive power has a convex object-side surface 211 and a convex image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a convex object-side surface 231 and a concave image-side surface 232, and is made of plastic material. The object-side surface 231 and the image-side surface 232 of the third lens element 230 are aspheric. Moreover, the third lens element 230 has inflection points formed on the object-side surface 231 and the image-side surface 232 thereof.

The fourth lens element 240 with positive refractive power has a concave object-side surface 241 and a convex image-side surface 242, and is made of plastic material. The object-side surface 241 and the image-side surface 242 of the fourth lens element 240 are aspheric. Moreover, the fourth lens element 240 has inflection points formed on the image-side surface 242 thereof. Additionally, the positive refractive power of the fourth lens element 240 decreases when moving away from the optical axis.

The fifth lens element 250 with negative refractive power has a convex object-side surface 251 and a concave image-side surface 252, and is made of plastic material. The object-side surface 251 and the image-side surface 252 of the fifth lens element 250 are aspheric. Moreover, the fifth lens element 250 has inflection points formed on the object-side surface 251 and the image-side surface 252 thereof. Therefore, the negative refractive power of the fifth lens element 250 decreases when moving away from the optical axis.

The IR cut filter 270 is made of glass and located between the fifth lens element 250 and the image plane 260, and will not affect the focal length of the image lens assembly.

The detailed optical data of the 2nd embodiment are shown in Table 3 and the aspheric surface data are shown in Table 4 below.

TABLE 3

2nd Embodiment
f = 2.80 mm, Fno = 1.70, HFOV = 38.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.146 | | | | |
| 2 | Lens 1 | 1.904740 (ASP) | 0.490 | Plastic | 1.544 | 55.9 | 3.39 |
| 3 | | −50.996100 (ASP) | 0.190 | | | | |
| 4 | Lens 2 | 11.516100 (ASP) | 0.223 | Plastic | 1.650 | 21.4 | −4.80 |
| 5 | | 2.434820 (ASP) | 0.234 | | | | |
| 6 | Lens 3 | 3.344500 (ASP) | 0.458 | Plastic | 1.544 | 55.9 | 7.51 |
| 7 | | 17.511400 (ASP) | 0.338 | | | | |
| 8 | Lens 4 | −4.822900 (ASP) | 0.547 | Plastic | 1.544 | 55.9 | 1.55 |
| 9 | | −0.745630 (ASP) | −0.300 | | | | |
| 10 | Stop | Plano | 0.350 | | | | |
| 11 | Lens 5 | 42.673000 (ASP) | 0.558 | Plastic | 1.544 | 55.9 | −1.49 |
| 12 | | 0.790390 (ASP) | 0.550 | | | | |
| 13 | IR-Filter | Plano | 0.300 | Glass | 1.517 | 64.2 | — |
| 14 | | Plano | 0.184 | | | | |
| 15 | Image | Plano | — | | | | |

Note:
Reference wavelength (d-line) is 587.6 nm.
Effective radius of Surface 10 is 1.45 mm.

TABLE 4

Aspheric Coefficients

| Surface # | 2 | 3 | 4 | 5 | 6 |
|---|---|---|---|---|---|
| k = | 6.48797E−01 | −1.00000E+00 | 1.00000E+01 | −7.69868E+00 | −9.00000E+01 |
| A4 = | −3.91461E−02 | −3.59083E−02 | −2.25174E−01 | −1.68709E−01 | 1.04847E−01 |
| A6 = | 1.33926E−01 | −1.06861E−01 | 1.67527E−01 | 2.22579E−01 | −2.77195E−01 |
| A8 = | −4.85946E−01 | 1.69335E−01 | −4.73179E−01 | −3.32477E−01 | 2.07926E−01 |
| A10 = | 6.18354E−01 | −5.50948E−01 | 8.75943E−01 | 2.03061E−01 | −2.25545E−02 |
| A12 = | −3.25390E−01 | 7.46213E−01 | −1.43541E+00 | −4.51618E−02 | −8.58331E−02 |
| A14 = | −1.03504E−01 | −8.59983E−01 | 9.04493E−01 | −4.87941E−02 | −1.26123E−02 |
| A16 = | 8.36403E−04 | 4.67095E−01 | 4.48419E−03 | 3.41957E−02 | 3.33001E−02 |

| Surface # | 7 | 8 | 9 | 11 | 12 |
|---|---|---|---|---|---|
| k = | −1.00000E+00 | 8.27199E−01 | −3.54748E+00 | −1.00000E+00 | −4.95114E+00 |
| A4 = | −2.02865E−01 | −3.04917E−01 | −2.13264E−01 | 2.91291E−02 | −6.55143E−02 |
| A6 = | 4.55880E−01 | 5.93518E−01 | 2.34320E−01 | −8.27293E−02 | 2.72166E−02 |
| A8 = | −7.91893E−01 | −5.24850E−01 | −2.76726E−02 | 4.83554E−02 | −9.92094E−03 |
| A10 = | 5.20028E−01 | 2.02257E−01 | −3.82926E−02 | −1.37790E−02 | 2.23507E−03 |
| A12 = | −4.24511E−03 | −3.93834E−02 | 6.53974E−03 | 3.27834E−03 | −3.06454E−04 |
| A14 = | −1.95121E−01 | −1.35937E−02 | 5.03825E−04 | −9.81351E−04 | 1.65711E−05 |
| A16 = | 8.06540E−02 | 7.51448E−03 | 8.14022E−04 | 1.43030E−04 | |

In the image lens assembly according to the 2nd embodiment, the definitions of f, FOV, V1, V2, EPD, CT2, CT3, SL, TTL and ImgH are the same as those stated in the 1st embodiment with corresponding values for the 2nd embodiment. Moreover, these parameters can be calculated from Table 3 and Table 4 as the following values and satisfy the following relationships:

| | |
|---|---|
| f (mm) | 2.80 |
| FOV (deg.) | 76.8 |
| V1 − V2 | 34.5 |
| f/EPD | 1.70 |
| EPD/CT2 | 7.38 |
| CT2/CT3 | 0.49 |
| SL/TTL | 0.96 |
| TTL/ImgH | 1.79 |

3rd Embodiment

Figure 5:
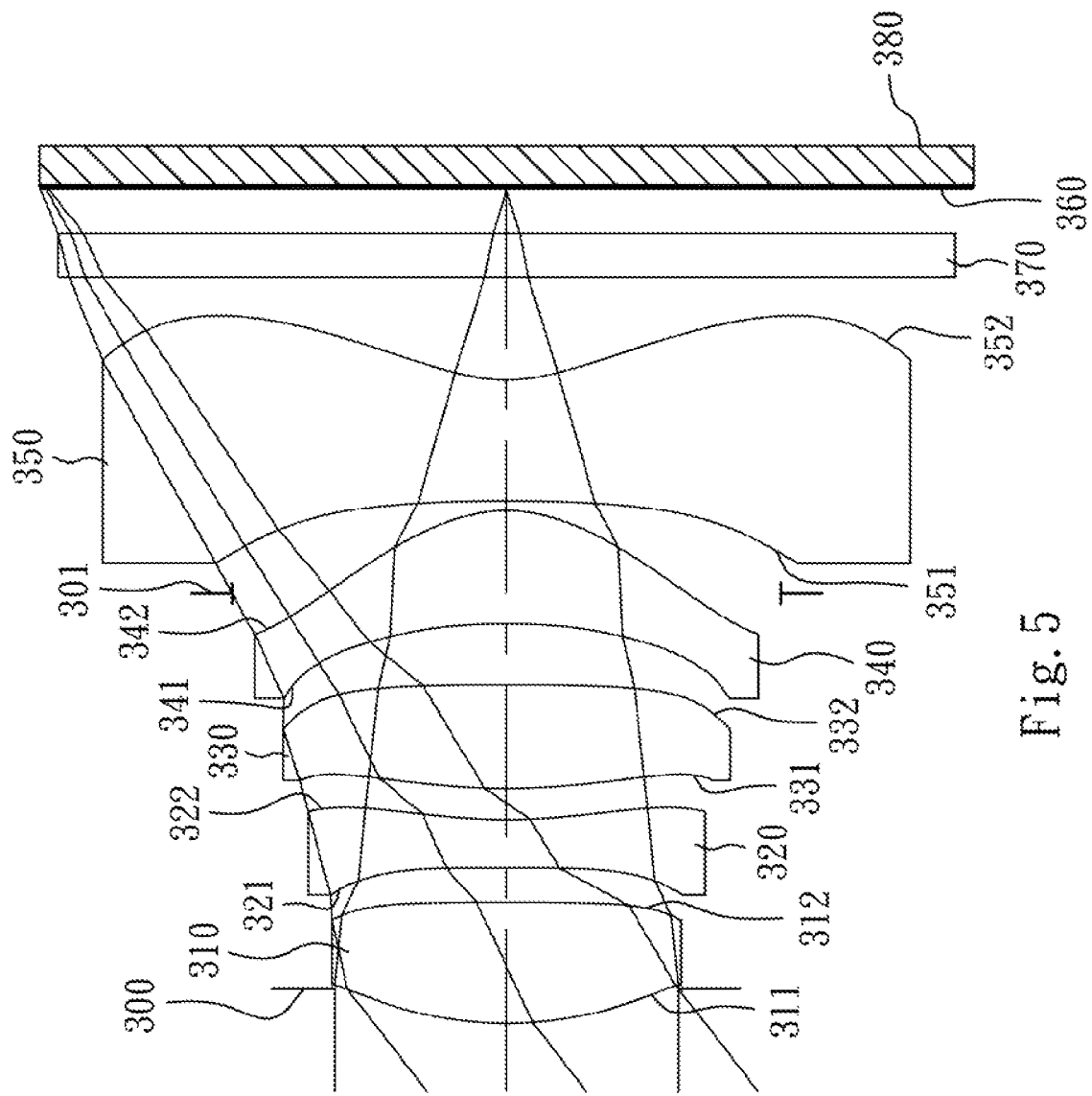
FIG. 5 is a schematic view of an image lens assembly according to the 3rd embodiment of the present disclosure.
Figure 6:
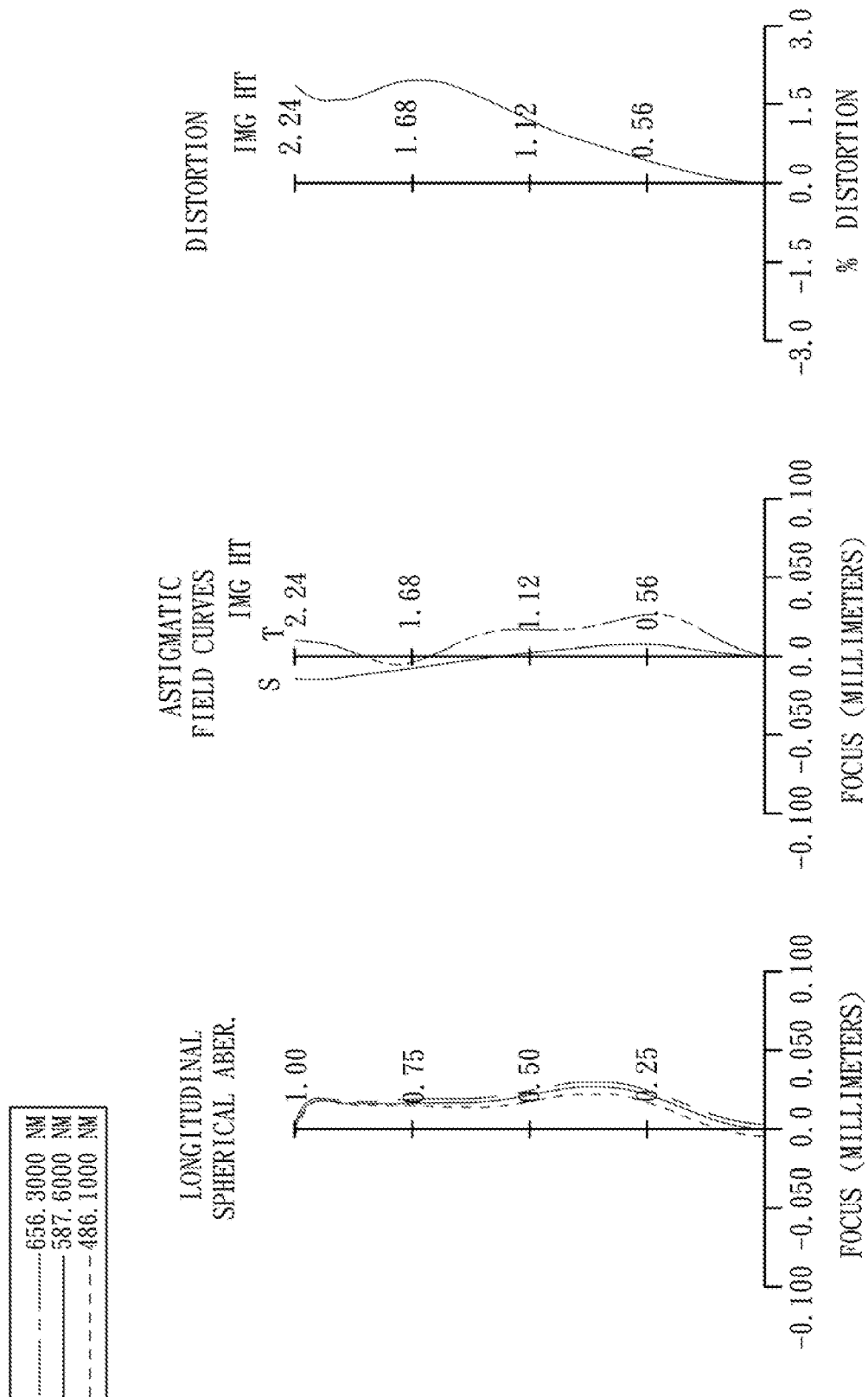
FIG. 6 shows spherical aberration curves, astigmatic field curves and a distortion curve of the image lens assembly according to the 3rd embodiment.

FIG. 5 is a schematic view of an image lens assembly according to the 3rd embodiment of the present disclosure. FIG. 6 shows spherical aberration curves, astigmatic field curves and a distortion curve of the image lens assembly according to the 3rd embodiment. In FIG. 5, the image lens assembly includes, in order from an object side to an image side, an aperture stop 300, the first lens element 310, the second lens element 320, the third lens element 330, the fourth lens element 340, a stop 301, the fifth lens element 350, an IR cut filter 370, an image plane 360 and an image sensor 380.

The first lens element 310 with positive refractive power has a convex object-side surface 311 and a convex image-side surface 312, and is made of plastic material. The object-side surface 311 and the image-side surface 312 of the first lens element 310 are aspheric.

The second lens element 320 with negative refractive power has a concave object-side surface 321 and a concave image-side surface 322, and is made of plastic material. The object-side surface 321 and the image-side surface 322 of the second lens element 320 are aspheric.

The third lens element 330 with positive refractive power has a convex object-side surface 331 and a convex image-side surface 332, and is made of plastic material. The object-side surface 331 and the image-side surface 332 of the third lens element 330 are aspheric. Moreover, the third lens element 330 has inflection points formed on the object-side surface 331 thereof.

The fourth lens element 340 with positive refractive power has a concave object-side surface 341 and a convex image-side surface 342, and is made of plastic material. The object-side surface 341 and the image-side surface 342 of the fourth lens element 340 are aspheric. Moreover, the fourth lens element 340 has inflection points formed on the image-side surface 342 thereof. Therefore, the positive refractive power of the fourth lens element 340 decreases when moving away from the optical axis.

The fifth lens element 350 with negative refractive power has a concave object-side surface 351 and a concave image-side surface 352, and is made of plastic material. The object-side surface 351 and the image-side surface 352 of the fifth lens element 350 are aspheric. Moreover, the fifth lens element 350 has inflection points formed on the object-side surface 351 and the image-side surface 352 thereof. Therefore, the negative refractive power of the fifth lens element 350 decreases when moving away from the optical axis.

The IR cut filter 370 is made of glass and located between the fifth lens element 350 and the image plane 360, and will not affect the focal length of the to image lens assembly.

The detailed optical data of the 3rd embodiment are shown in Table 5 and the aspheric surface data are shown in Table 6 below.

TABLE 5

3rd Embodiment
f = 2.83 mm, Fno = 1.70, HFOV = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.170 | | | | |
| 2 | Lens 1 | 1.748740 (ASP) | 0.587 | Plastic | 1.544 | 55.9 | 3.09 |
| 3 | | −39.142200 (ASP) | 0.171 | | | | |
| 4 | Lens 2 | −84.745800 (ASP) | 0.230 | Plastic | 1.640 | 23.3 | −3.82 |
| 5 | | 2.521600 (ASP) | 0.151 | | | | |
| 6 | Lens 3 | 2.920820 (ASP) | 0.504 | Plastic | 1.544 | 55.9 | 5.15 |
| 7 | | −66.387200 (ASP) | 0.298 | | | | |
| 8 | Lens 4 | −3.537500 (ASP) | 0.547 | Plastic | 1.544 | 55.9 | 1.52 |
| 9 | | −0.705130 (ASP) | −0.400 | | | | |
| 10 | Stop | Plano | 0.450 | | | | |
| 11 | Lens 5 | −7.251900 (ASP) | 0.585 | Plastic | 1.544 | 55.9 | −1.32 |
| 12 | | 0.821450 (ASP) | 0.500 | | | | |
| 13 | IR-Filter | Plano | 0.210 | Glass | 1.517 | 64.2 | — |
| 14 | | Plano | 0.227 | | | | |
| 15 | Image | Plano | — | | | | |

Note:
Reference wavelength (d-line) is 587.6 nm.
Effective radius of the Surface 10 is 1.33 mm.

TABLE 6

Aspheric Coefficients

| Surface # | 2 | 3 | 4 | 5 | 6 |
|---|---|---|---|---|---|
| k = | 6.04815E−01 | −1.00000E+00 | −9.90000E+01 | −1.00577E+01 | −5.91408E+01 |
| A4 = | −3.82623E−02 | −4.20449E−02 | −2.35141E−01 | −1.69189E−01 | 1.14714E−01 |
| A6 = | 1.26531E−01 | −1.51059E−01 | 1.47309E−01 | 2.29841E−01 | −2.69397E−01 |
| A8 = | −5.11512E−01 | 1.93053E−01 | −4.73436E−01 | −3.24452E−01 | 2.00987E−01 |
| A10 = | 7.25463E−01 | −5.40516E−01 | 8.79690E−01 | 2.00923E−01 | −2.78277E−02 |
| A12 = | −4.01449E−01 | 7.46197E−01 | −1.40112E+00 | −5.16096E−02 | −7.98312E−02 |
| A14 = | −1.04086E−01 | −8.59676E−01 | 9.04333E−01 | −5.30956E−02 | −8.39974E−03 |
| A16 = | 8.36022E−04 | 4.67095E−01 | 4.48389E−03 | 3.82126E−02 | 2.02454E−02 |

| Surface # | 7 | 8 | 9 | 11 | 12 |
|---|---|---|---|---|---|
| k = | −1.00000E+00 | 3.08574E+00 | −3.30078E+00 | −1.00000E+00 | −5.74694E+00 |
| A4 = | −1.87705E−01 | −3.13909E−01 | −2.34513E−01 | 9.37372E−03 | −8.52106E−02 |
| A6 = | 4.67567E−01 | 6.07777E−01 | 2.35025E−01 | −8.06616E−02 | 3.82691E−02 |
| A8 = | −7.96146E−01 | −5.36256E−01 | −3.21869E−02 | 4.74520E−02 | −1.37404E−02 |
| A10 = | 5.12053E−01 | 1.85898E−01 | −3.98502E−02 | −1.47005E−02 | 2.58645E−03 |
| A12 = | −1.15537E−02 | −4.80814E−02 | 7.80305E−03 | 3.07384E−03 | −2.96260E−04 |
| A14 = | −1.98649E−01 | −1.39128E−02 | 1.79917E−03 | −8.67422E−04 | 1.77974E−05 |
| A16 = | 8.54029E−02 | 1.05122E−02 | 1.52991E−03 | 2.50982E−04 | |

In the image lens assembly according to the 3rd embodiment, the definitions of f, FOV, V1, V2, EPD, CT2, CT3, SL, TTL and ImgH are the same as those stated in the 1st embodiment with corresponding values for the 3rd embodiment. Moreover, these parameters can be calculated from Table 5 and Table 6 as the following values and satisfy the following relationships:

| | |
|---|---|
| f (mm) | 2.83 |
| FOV (deg.) | 75.4 |
| V1 − V2 | 32.6 |
| f/EPD | 1.70 |
| EPD/CT2 | 7.25 |
| CT2/CT3 | 0.46 |
| SL/TTL | 0.96 |
| TTL/ImgH | 1.78 |

4th Embodiment

Figure 7:
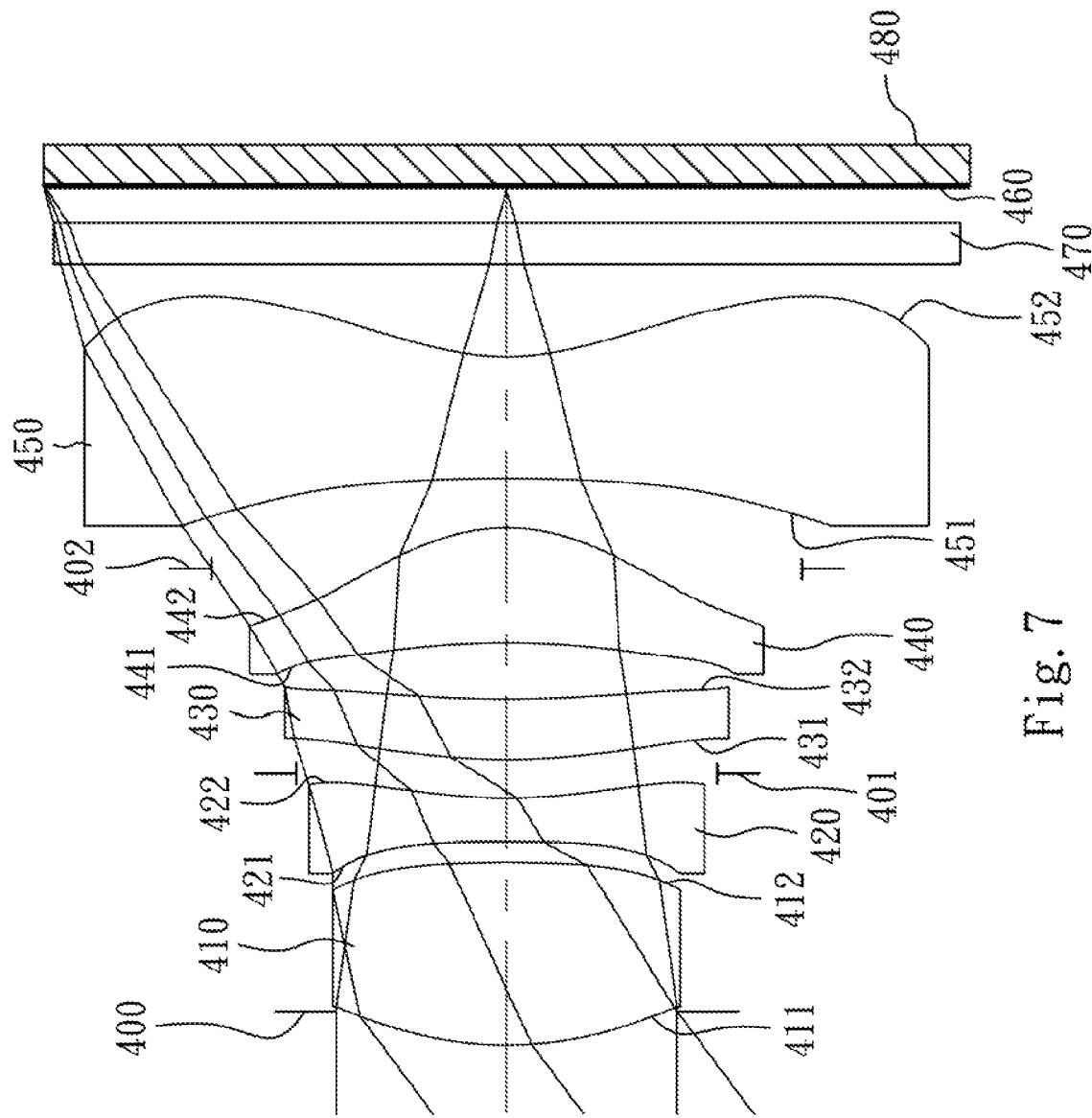
FIG. 7 is a schematic view of an image lens assembly according to the 4th embodiment of the present disclosure.
Figure 8:
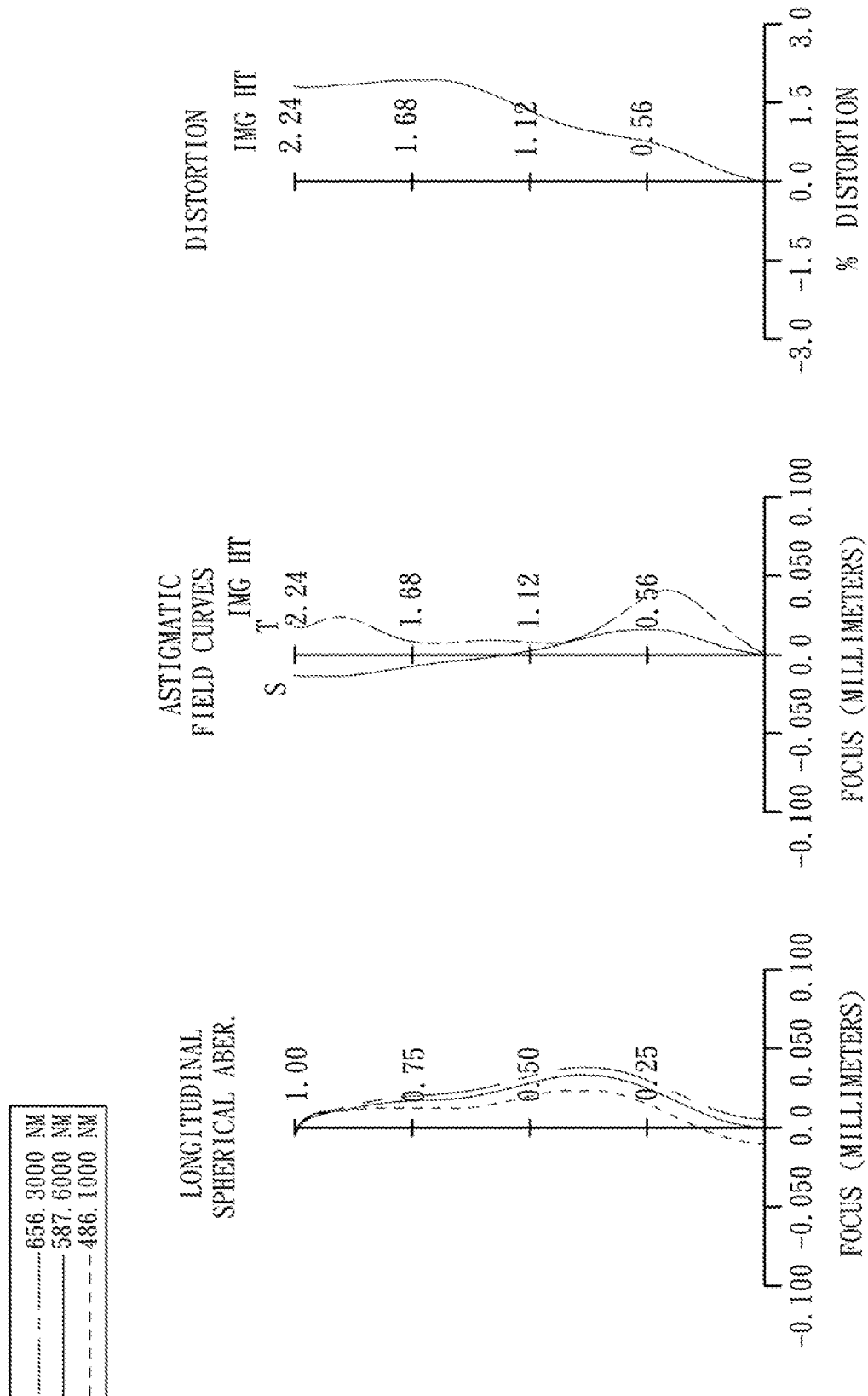
FIG. 8 shows spherical aberration curves, astigmatic field curves and a distortion curve of the image lens assembly according to the 4th embodiment.

FIG. 7 is a schematic view of an image lens assembly according to the 4th embodiment of the present disclosure. FIG. 8 shows spherical aberration curves, astigmatic field curves and a distortion curve of the image lens assembly according to the 4th embodiment. In FIG. 7, the image lens assembly includes, in order from an object side to an image side, an aperture stop 400, the first lens element 410, the second lens element 420, a stop 401, the third lens element 430, the fourth lens element 440, a stop 402, the fifth lens element 450, an IR cut filter 470, an image plane 460 and an image sensor 480.

The first lens element 410 with positive refractive power has a convex object-side surface 411 and a convex image-side surface 412, and is made of plastic material. The object-side surface 411 and the image-side surface 412 of the first lens element 410 are aspheric.

The second lens element 420 with negative refractive power has a concave object-side surface 421 and a concave image-side surface 422, and is made of plastic material. The object-side surface 421 and the image-side surface 422 of the second lens element 420 are aspheric.

The third lens element 430 with positive refractive power has a convex object-side surface 431 and a concave image-side surface 432, and is made of plastic material. The object-side surface 431 and the image-side surface 432 of the third lens element 430 are aspheric. Moreover, the third lens element 430 has inflection points formed on the object-side surface 431 thereof.

The fourth lens element 440 with positive refractive power has a concave object-side surface 441 and a convex image-side surface 442, and is made of plastic material. The object-side surface 441 and the image-side surface 442 of the fourth lens element 440 are aspheric. Moreover, the fourth lens element 440 has inflection points formed on the object-side surface 441 and the image-side surface 442 thereof. Additionally, the positive refractive power of the fourth lens element 440 decreases when moving away from the optical axis.

The fifth lens element 450 with negative refractive power has a concave object-side surface 451 and a concave image-side surface 452, and is made of plastic material. The object-side surface 451 and the image-side surface 452 of the fifth lens element 450 are aspheric. Moreover, the fifth lens element 450 has inflection points formed on the image-side surface 452 thereof. Additionally, the negative refractive power of the fifth lens element 450 decreases when moving away from the optical axis.

The IR cut filter 470 is made of glass and located between the fifth lens element 450 and the image plane 460, and will not affect the focal length of the image lens assembly.

The detailed optical data of the 4th embodiment are shown in Table 7 and the aspheric surface data are shown in Table 8 below.

TABLE 7

4th Embodiment
f = 2.93 mm, Fno = 1.78, HFOV = 36.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.165 | | | | |
| 2 | Lens 1 | 1.805000 (ASP) | 0.887 | Plastic | 1.544 | 55.9 | 2.64 |
| 3 | | −5.786700 (ASP) | 0.099 | | | | |
| 4 | Lens 2 | −14.662700 (ASP) | 0.210 | Plastic | 1.640 | 23.3 | −3.27 |
| 5 | | 2.453050 (ASP) | 0.119 | | | | |
| 6 | Stop | Plano | 0.070 | | | | |
| 7 | Lens 3 | 2.930700 (ASP) | 0.290 | Plastic | 1.634 | 23.8 | 10.16 |
| 8 | | 5.169300 (ASP) | 0.273 | | | | |
| 9 | Lens 4 | −4.712400 (ASP) | 0.559 | Plastic | 1.544 | 55.9 | 1.91 |
| 10 | | −0.886570 (ASP) | −0.200 | | | | |
| 11 | Stop | Plano | 0.441 | | | | |
| 12 | Lens 5 | −7.373500 (ASP) | 0.586 | Plastic | 1.544 | 55.9 | −1.82 |
| 13 | | 1.178400 (ASP) | 0.450 | | | | |
| 14 | IR-Filter | Plano | 0.200 | Glass | 1.517 | 64.2 | — |
| 15 | | Plano | 0.179 | | | | |
| 16 | Image | Plano | — | | | | |

Note:
Reference wavelength (d-line) is 587.6 nm
Effective radius of the Surface 6 is 1.02 mm
Effective radius of the Surface 11 is 1.43 mm

TABLE 8

Aspheric Coefficients

| Surface # | 2 | 3 | 4 | 5 | 7 |
|---|---|---|---|---|---|
| k = | 7.60331E−01 | −1.00000E+00 | −1.00000E+00 | −6.22006E+00 | −5.96281E+01 |
| A4 = | −4.97905E−02 | −6.34052E−02 | −2.36530E−01 | −1.59066E−01 | 1.25657E−01 |
| A6 = | 1.52398E−01 | −1.26478E−01 | 1.22811E−01 | 2.37077E−01 | −2.55785E−01 |
| A8 = | −4.70927E−01 | 1.53661E−01 | −4.52776E−01 | −3.19012E−01 | 2.10353E−01 |
| A10 = | 5.48027E−01 | −4.65583E−01 | 9.15628E−01 | 1.96007E−01 | −1.50363E−02 |
| A12 = | −2.00051E−01 | 7.33617E−01 | −1.45927E+00 | −6.62504E−02 | −6.23602E−02 |
| A14 = | −1.04085E−01 | −8.55951E−01 | 9.04509E−01 | −5.88262E−02 | −2.30061E−03 |
| A16 = | 9.24008E−04 | 4.66939E−01 | 4.52739E−03 | 5.31959E−02 | 1.34713E−02 |

| Surface # | 8 | 9 | 10 | 12 | 13 |
|---|---|---|---|---|---|
| k = | −1.00000E+00 | −5.00000E+01 | −3.56199E+00 | −1.00000E+00 | −5.84526E+00 |
| A4 = | −1.44714E−01 | −2.19967E−01 | −1.86478E−01 | 4.38957E−02 | −5.80981E−02 |
| A6 = | 4.31428E−01 | 5.58424E−01 | 2.27068E−01 | −9.22648E−02 | 2.24591E−02 |
| A8 = | −7.60826E−01 | −5.35349E−01 | −2.25558E−02 | 5.21013E−02 | −9.57564E−03 |
| A10 = | 5.42660E−01 | 2.04949E−01 | −3.84136E−02 | −1.29426E−02 | 2.35092E−03 |
| A12 = | −1.07610E−03 | −2.90737E−02 | 5.35516E−03 | 2.98839E−03 | −3.26519E−04 |
| A14 = | −1.98166E−01 | −9.96060E−03 | −8.41452E−05 | −1.08584E−03 | 1.63193E−05 |
| A16 = | 8.22001E−02 | 4.56337E−03 | 9.76452E−04 | 1.72167E−04 | |

In the image lens assembly according to the 4th embodiment, the definitions of f, FOV, V1, V2, EPD, CT2, CT3, SL, TTL and ImgH are the same as those stated in the 1st embodiment with corresponding values for the 4th embodiment. Moreover, these parameters can be calculated from Table 7 and Table 8 as the following values and satisfy the following relationships:

| | |
|---|---|
| f (mm) | 2.93 |
| FOV (deg.) | 73.6 |
| V1 − V2 | 32.6 |
| f/EPD | 1.78 |
| EPD/CT2 | 7.85 |
| CT2/CT3 | 0.72 |
| SL/TTL | 0.96 |
| TTL/ImgH | 1.83 |

5th Embodiment

Figure 9:
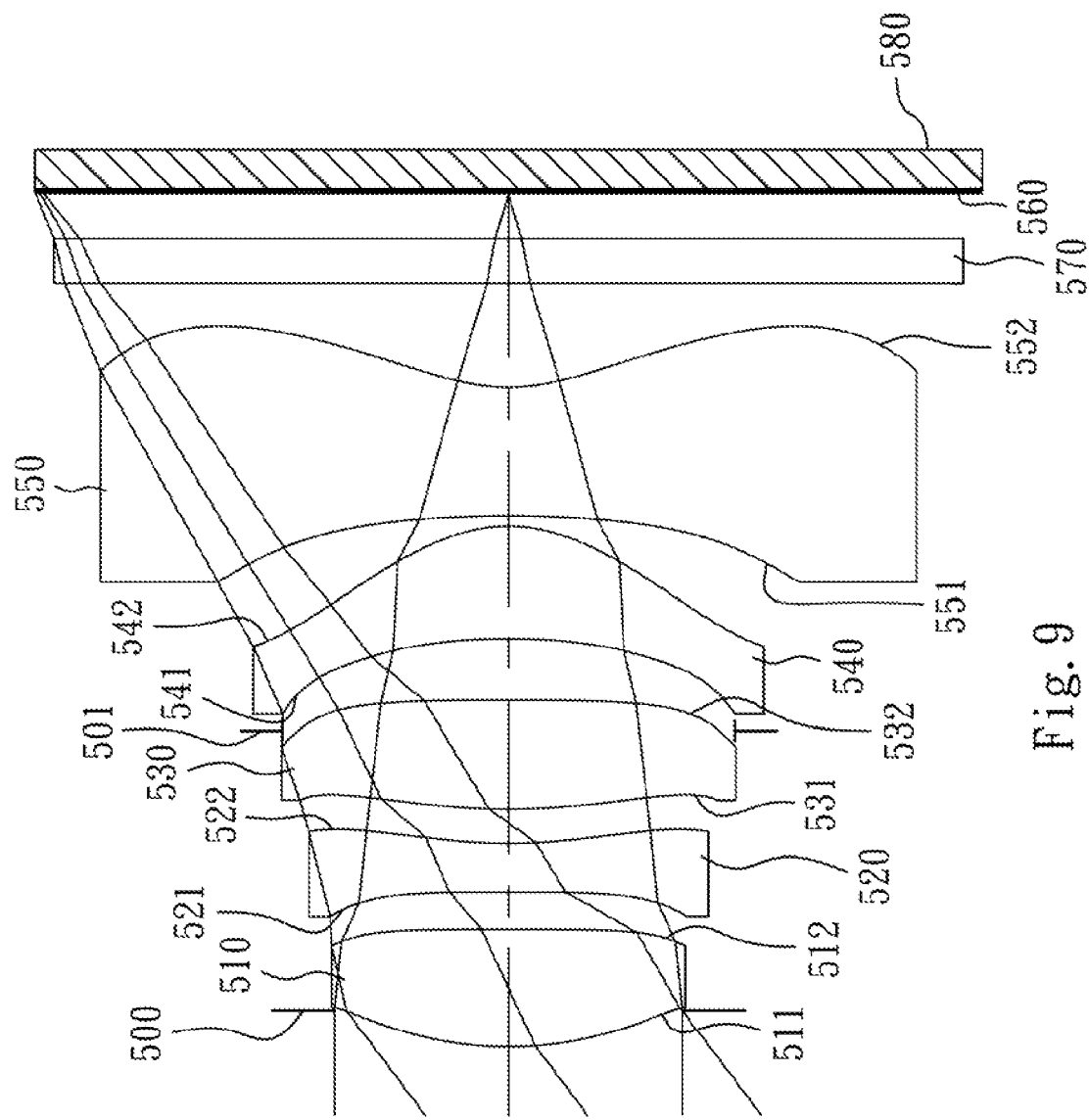
FIG. 9 is a schematic view of an image lens assembly according to the 5th embodiment of the present disclosure.
Figure 10:
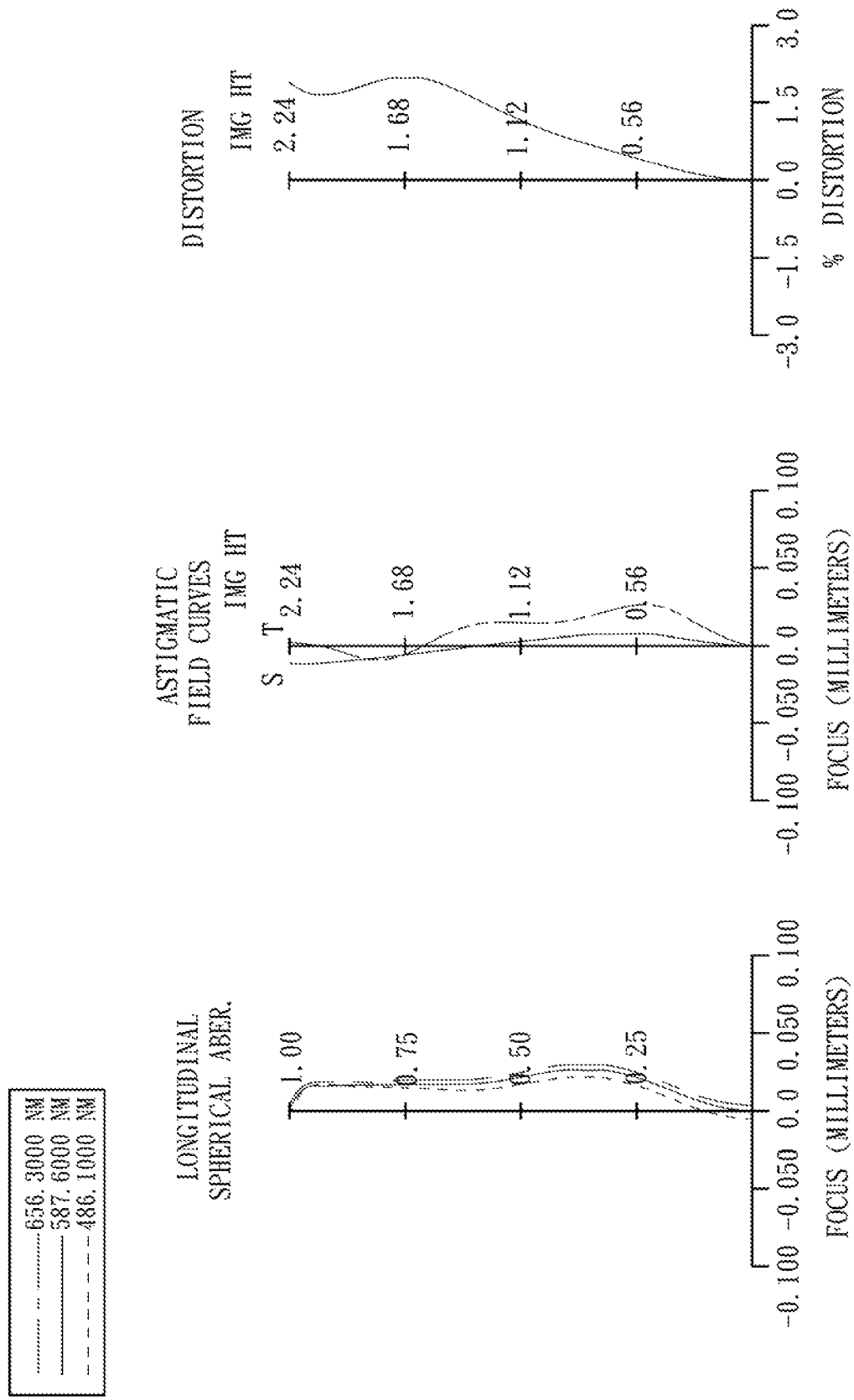
FIG. 10 shows spherical aberration curves, astigmatic field curves and a distortion curve of the image lens assembly according to the 5th embodiment.

FIG. 9 is a schematic view of an image lens assembly according to the 5th embodiment of the present disclosure. FIG. 10 shows spherical aberration curves, astigmatic field curves and a distortion curve of the image lens assembly according to the 5th embodiment. In FIG. 9, the image lens assembly includes, in order from an object side to an image side, an aperture stop 500, the first lens element 510, the second lens element 520, the third lens element 530, a stop 501, the fourth lens element 540, the fifth lens element 550, an IR cut filter 570, an image plane 560 and an image sensor 580.

The first lens element 510 with positive refractive power has a convex object-side surface 511 and a convex image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with positive refractive power has a convex object-side surface 531 and a convex image-side surface 532, and is made of plastic material. The object-side surface 531 and the image-side surface 532 of the third lens element 530 are aspheric. Moreover, the third lens element 530 has inflection points formed on the object-side surface 531 thereof.

The fourth lens element 540 with positive refractive power has a concave object-side surface 541 and a convex image-side surface 542, and is made of plastic material. The object-side surface 541 and the image-side surface 542 of the fourth lens element 540 are aspheric. Moreover, the fourth lens element 540 has inflection points formed on the image-side surface 542 thereof. Additionally, the positive refractive power of the fourth lens element 540 decreases when moving away from the optical axis.

The fifth lens element 550 with negative refractive power has a concave object-side surface 551 and a concave image-side surface 552, and is made of plastic material. The object-side surface 551 and the image-side surface 552 of the fifth lens element 550 are aspheric. Moreover, the fifth lens element 550 has inflection points formed on the image-side surface 552 thereof. Additionally, the negative refractive power of the fifth lens element 550 decreases when moving away from the optical axis.

The IR cut filter 570 is made of glass and located between the fifth lens element 550 and the image plane 560, and will not affect the focal length of the image lens assembly.

The detailed optical data of the 5th embodiment are shown in Table 9 and the aspheric surface data are shown in Table 10 below.

TABLE 9

5th Embodiment
f = 2.90 mm, Fno = 1.75, HFOV = 37.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.173 | | | | |
| 2 | Lens 1 | 1.725170 (ASP) | 0.559 | Plastic | 1.544 | 55.9 | 3.11 |
| 3 | | −79.384500 (ASP) | 0.181 | | | | |
| 4 | Lens 2 | 45.556500 (ASP) | 0.230 | Plastic | 1.640 | 23.3 | −3.97 |
| 5 | | 2.398670 (ASP) | 0.163 | | | | |
| 6 | Lens 3 | 2.964410 (ASP) | 0.521 | Plastic | 1.544 | 55.9 | 5.37 |
| 7 | | −187.222600 (ASP) | −0.145 | | | | |
| 8 | Stop | Plano | 0.440 | | | | |
| 9 | Lens 4 | −3.631900 (ASP) | 0.536 | Plastic | 1.544 | 55.9 | 1.54 |
| 10 | | −0.715940 (ASP) | 0.050 | | | | |
| 11 | Lens 5 | −5.156800 (ASP) | 0.613 | Plastic | 1.544 | 55.9 | −1.32 |
| 12 | | 0.867430 (ASP) | 0.500 | | | | |
| 13 | IR-Filter | Plano | 0.210 | Glass | 1.517 | 64.2 | — |
| 14 | | Plano | 0.228 | | | | |
| 15 | Image | Plano | — | | | | |

Note:
Reference wavelength (d-line) is 587.6 nm.
Effective radius of the Surface 8 is 1.08 mm

TABLE 10

Aspheric Coefficients

| Surface # | 2 | 3 | 4 | 5 | 6 |
|---|---|---|---|---|---|
| k = | 5.88454E−01 | −1.00000E+00 | 1.00000E+01 | −9.18208E+00 | −6.05300E+01 |
| A4 = | −3.72922E−02 | −4.34689E−02 | −2.42338E−01 | −1.68950E−01 | 1.15704E−01 |
| A6 = | 1.16421E−01 | −1.45856E−01 | 1.52322E−01 | 2.29567E−01 | −2.67610E−01 |
| A8 = | −4.89092E−01 | 1.96419E−01 | −4.64480E−01 | −3.21040E−01 | 2.00361E−01 |
| A10 = | 6.96087E−01 | −5.48580E−01 | 8.91516E−01 | 2.08766E−01 | −2.74508E−02 |
| A12 = | −4.01418E−01 | 7.46260E−01 | −1.40142E+00 | −5.15254E−02 | −7.98050E−02 |
| A14 = | −1.04086E−01 | −8.59676E−01 | 9.04333E−01 | −5.30798E−02 | −8.38114E−03 |
| A16 = | 8.36020E−04 | 4.67095E−01 | 4.48389E−03 | 3.82126E−02 | 2.02454E−02 |

| Surface # | 7 | 9 | 10 | 11 | 12 |
|---|---|---|---|---|---|
| k = | −1.00000E+00 | 3.48637E+00 | −3.27542E+00 | −1.00000E+00 | −6.05468E+00 |
| A4 = | −1.92444E−01 | −3.16943E−01 | −2.31577E−01 | 1.77846E−02 | −8.62843E−02 |
| A6 = | 4.65231E−01 | 6.09519E−01 | 2.41338E−01 | −8.09759E−02 | 3.88939E−02 |
| A8 = | −7.97091E−01 | −5.35566E−01 | −3.04666E−02 | 4.74353E−02 | −1.37532E−02 |
| A10 = | 5.11173E−01 | 1.84257E−01 | −3.96223E−02 | −1.49073E−02 | 2.50448E−03 |

TABLE 10-continued

Aspheric Coefficients

| | | | | | |
|---|---|---|---|---|---|
| A12 = | −1.21986E−02 | −4.80757E−02 | 7.55080E−03 | 3.04018E−03 | −2.70144E−04 |
| A14 = | −1.98598E−01 | −1.39724E−02 | 1.55473E−03 | −8.61500E−04 | 1.50657E−05 |
| A16 = | 8.54452E−02 | 1.04694E−02 | 1.24712E−03 | 2.78319E−04 | |

In the image lens assembly according to the 5th embodiment, the definitions of f, FOV, V1, V2, EPD, CT2, CT3, SL, TTL and ImgH are the same as those stated in the 1st embodiment with corresponding values for the 5th embodiment. Moreover, these parameters can be calculated from Table 9 and Table 10 as the following values and satisfy the following relationships:

| | |
|---|---|
| f (mm) | 2.90 |
| FOV (deg.) | 74.0 |
| V1 − V2 | 32.6 |
| f/EPD | 1.75 |
| EPD/CT2 | 7.20 |
| CT2/CT3 | 0.44 |
| SL/TTL | 0.96 |
| TTL/ImgH | 1.79 |

6th Embodiment

Figure 11:
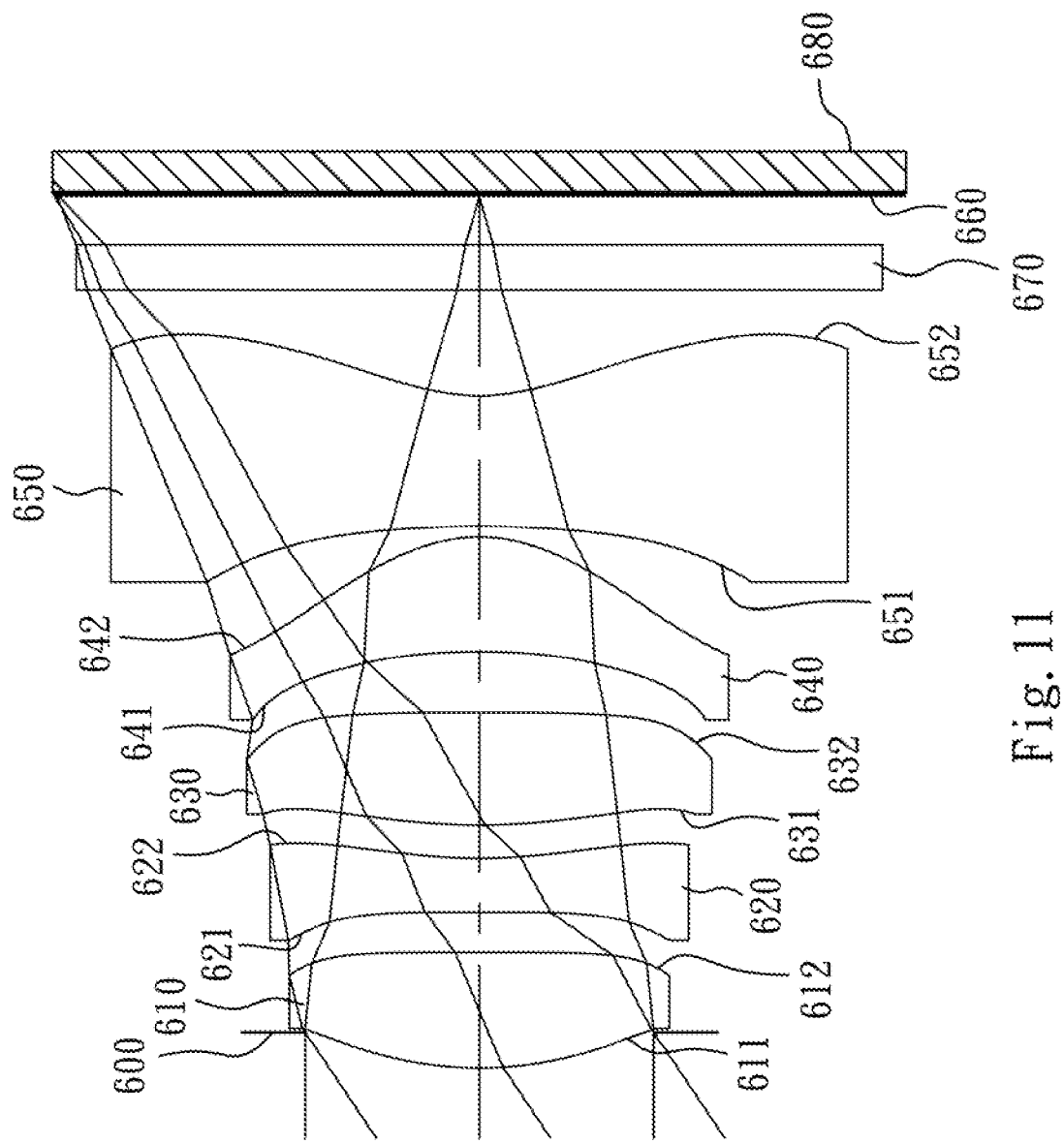
FIG. 11 is a schematic view of an image lens assembly according to the 6th embodiment of the present disclosure.
Figure 12:
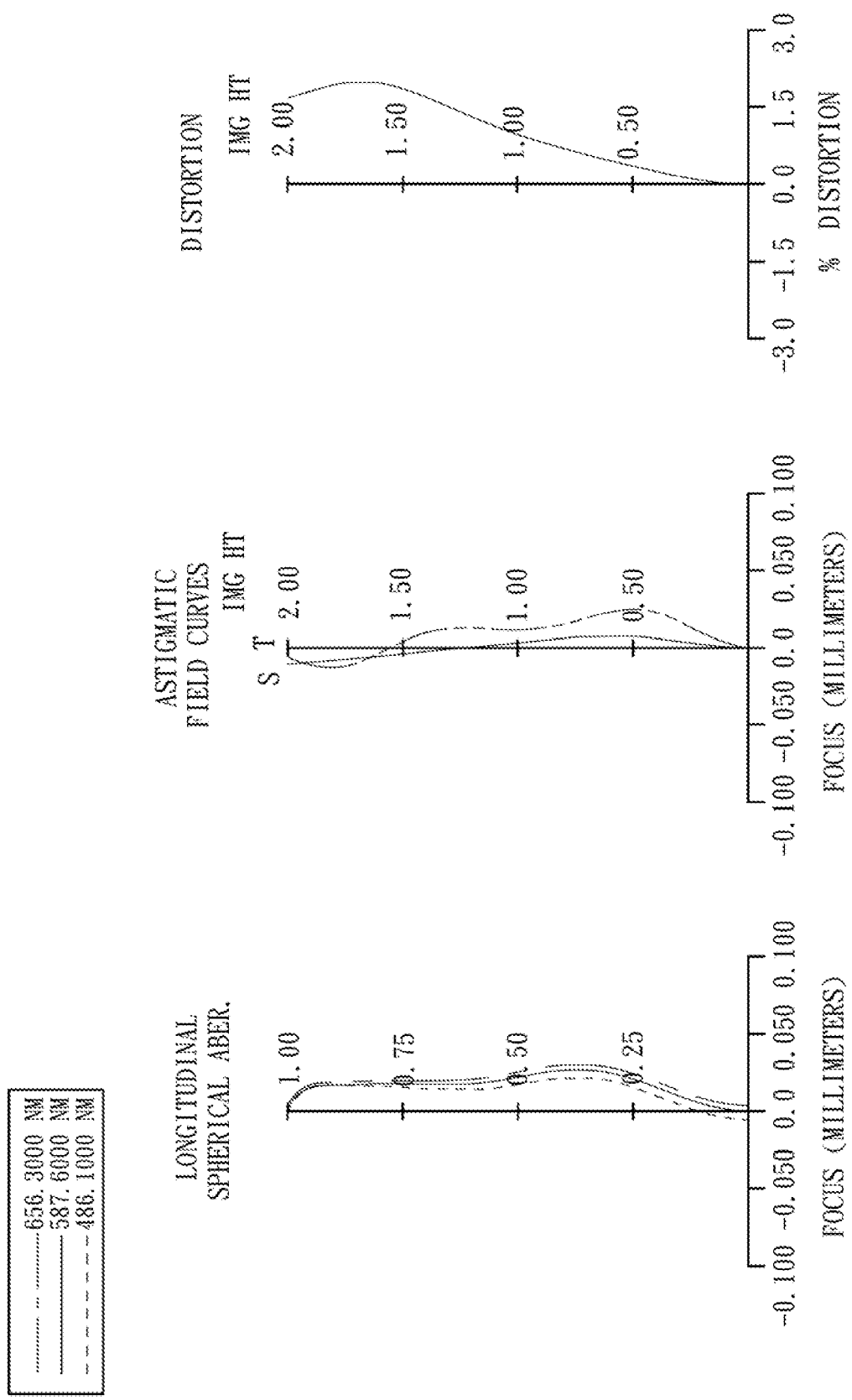
FIG. 12 shows spherical aberration curves, astigmatic field curves and a distortion curve of the image lens assembly according to the 6th embodiment.

FIG. 11 is a schematic view of an image lens assembly according to the 6th embodiment of the present disclosure. FIG. 12 shows spherical aberration curves, astigmatic field curves and a distortion curve of the image lens assembly according to the 6th embodiment. In FIG. 11, the image lens assembly includes, in order from an object side to an image side, an aperture stop 600, the first lens element 610, the second lens element 620, the third lens element 630, the fourth lens element 640, the fifth lens element 650, an IR cut filter 670, an image plane 660 and an image sensor 680.

The first lens element 610 with positive refractive power has a convex object-side surface 611 and a concave image-side surface 612, and is made of plastic material. The object-side surface 611 and the image-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric.

The third lens element 630 with positive refractive power has a convex object-side surface 631 and a concave image-side surface 632, and is made of plastic material. The object-side surface 631 and the image-side surface 632 of the third lens element 630 are aspheric. Moreover, the third lens element 630 has inflection points formed on the object-side surface 631 and the image-side surface 632 thereof.

The fourth lens element 640 with positive refractive power has a concave object-side surface 641 and a convex image-side surface 642, and is made of plastic material. The object-side surface 641 and the image-side surface 642 of the fourth lens element 640 are aspheric. Moreover, the fourth lens element 640 has inflection points formed on the image-side surface 642 thereof. Additionally, the positive refractive power of the fourth lens element 640 decreases when moving away from the optical axis:

The fifth lens element 650 with negative refractive power has a concave object-side surface 651 and a concave image-side surface 652, and is made of plastic material. The object-side surface 651 and the image-side surface 652 of the fifth lens element 650 are aspheric. Moreover, the fifth lens element 650 has inflection points formed on the image-side surface 652 thereof. Additionally, the negative refractive power of the fifth lens element 650 decreases when moving away from the optical axis.

The IR cut filter 670 is made of glass and located between the fifth lens element 650 and the image plane 660, and will not affect the focal length of the image lens assembly.

The detailed optical data of the 6th embodiment are shown in Table 11 and the aspheric surface data are shown in Table 12 below.

TABLE 11

6th Embodiment
f = 2.92 mm, Fno = 1.79, HFOV = 33.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.170 | | | | |
| 2 | Lens 1 | 1.718630 (ASP) | 0.542 | Plastic | 1.544 | 55.9 | 3.18 |
| 3 | | 226.526300 (ASP) | 0.191 | | | | |
| 4 | Lens 2 | 36.409300 (ASP) | 0.251 | Plastic | 1.640 | 23.3 | −3.99 |
| 5 | | 2.377760 (ASP) | 0.156 | | | | |
| 6 | Lens 3 | 2.811240 (ASP) | 0.528 | Plastic | 1.544 | 55.9 | 5.35 |
| 7 | | 77.676200 (ASP) | 0.288 | | | | |
| 8 | Lens 4 | −3.725900 (ASP) | 0.538 | Plastic | 1.544 | 55.9 | 1.53 |
| 9 | | −0.713520 (ASP) | 0.050 | | | | |
| 10 | Lens 5 | −5.039200 (ASP) | 0.611 | Plastic | 1.544 | 55.9 | −1.31 |
| 11 | | 0.867260 (ASP) | 0.500 | | | | |
| 12 | IR-Filter | Plano | 0.210 | Glass | 1.517 | 64.2 | — |
| 13 | | Plano | 0.241 | | | | |
| 14 | Image | Plano | — | | | | |

Note:
Reference wavelength (d-line) is 587.6 nm.

TABLE 12

| Aspheric Coefficients | | | | | |
|---|---|---|---|---|---|
| Surface # | 2 | 3 | 4 | 5 | 6 |
| k = | 5.41364E−01 | −1.00000E+00 | 1.00000E+01 | −9.34528E+00 | −5.16238E+01 |
| A4 = | −3.70860E−02 | −5.24711E−02 | −2.44760E−01 | −1.68333E−01 | 1.16134E−01 |
| A6 = | 1.06995E−01 | −1.55566E−01 | 1.49342E−01 | 2.35061E−01 | −2.65785E−01 |
| A8 = | −4.67024E−01 | 2.31500E−01 | −4.39776E−01 | −3.12379E−01 | 2.01303E−01 |
| A10 = | 6.69840E−01 | −5.54210E−01 | 9.17764E−01 | 2.12406E−01 | −2.59356E−02 |
| A12 = | −4.01306E−01 | 6.99044E−01 | −1.43368E+00 | −5.37285E−02 | −7.84629E−02 |
| A14 = | −1.04086E−01 | −8.29564E−01 | 9.05470E−01 | −5.69246E−02 | −7.28589E−03 |
| A16 = | 8.36021E−04 | 4.67095E−01 | 4.48389E−03 | 4.09839E−02 | 2.05530E−02 |
| Surface # | 7 | 8 | 9 | 10 | 11 |
| k = | −2.00000E+01 | 2.88857E+00 | −3.29708E+00 | −1.00000E+00 | −6.13143E+00 |
| A4 = | −1.89176E−01 | −3.16277E−01 | −2.34274E−01 | 1.92700E−02 | −8.48772E−02 |
| A6 = | 4.68561E−01 | 6.13392E−01 | 2.44879E−01 | −8.26176E−02 | 3.73628E−02 |
| A8 = | −7.97355E−01 | −5.33687E−01 | −2.95627E−02 | 4.67778E−02 | −1.32394E−02 |
| A10 = | 5.10550E−01 | 1.85654E−01 | −4.00122E−02 | −1.49216E−02 | 2.43990E−03 |
| A12 = | −1.27709E−02 | −4.92174E−02 | 7.28387E−03 | 3.15151E−03 | −2.68962E−04 |
| A14 = | −1.98981E−01 | −1.50270E−02 | 1.40404E−03 | −8.19066E−04 | 1.55768E−05 |
| A16 = | 8.50954E−02 | 1.05868E−02 | 1.20768E−03 | 2.73739E−04 | |

In the image lens assembly according to the 6th embodiment, the definitions of f, FOV, V1, V2, EPD, CT2, CT3, SL, TTL and ImgH are the same as those stated in the 1st embodiment with corresponding values for the 6th embodiment. Moreover, these parameters can be calculated from Table 11 and Table 12 as the following values and satisfy the following relationships:

| | |
|---|---|
| f (mm) | 2.92 |
| FOV (deg.) | 67.6 |
| V1 − V2 | 32.6 |
| f/EPD | 1.79 |
| EPD/CT2 | 6.51 |
| CT2/CT3 | 0.48 |
| SL/TTL | 0.96 |
| TTL/ImgH | 2.02 |

7th Embodiment

Figure 13:
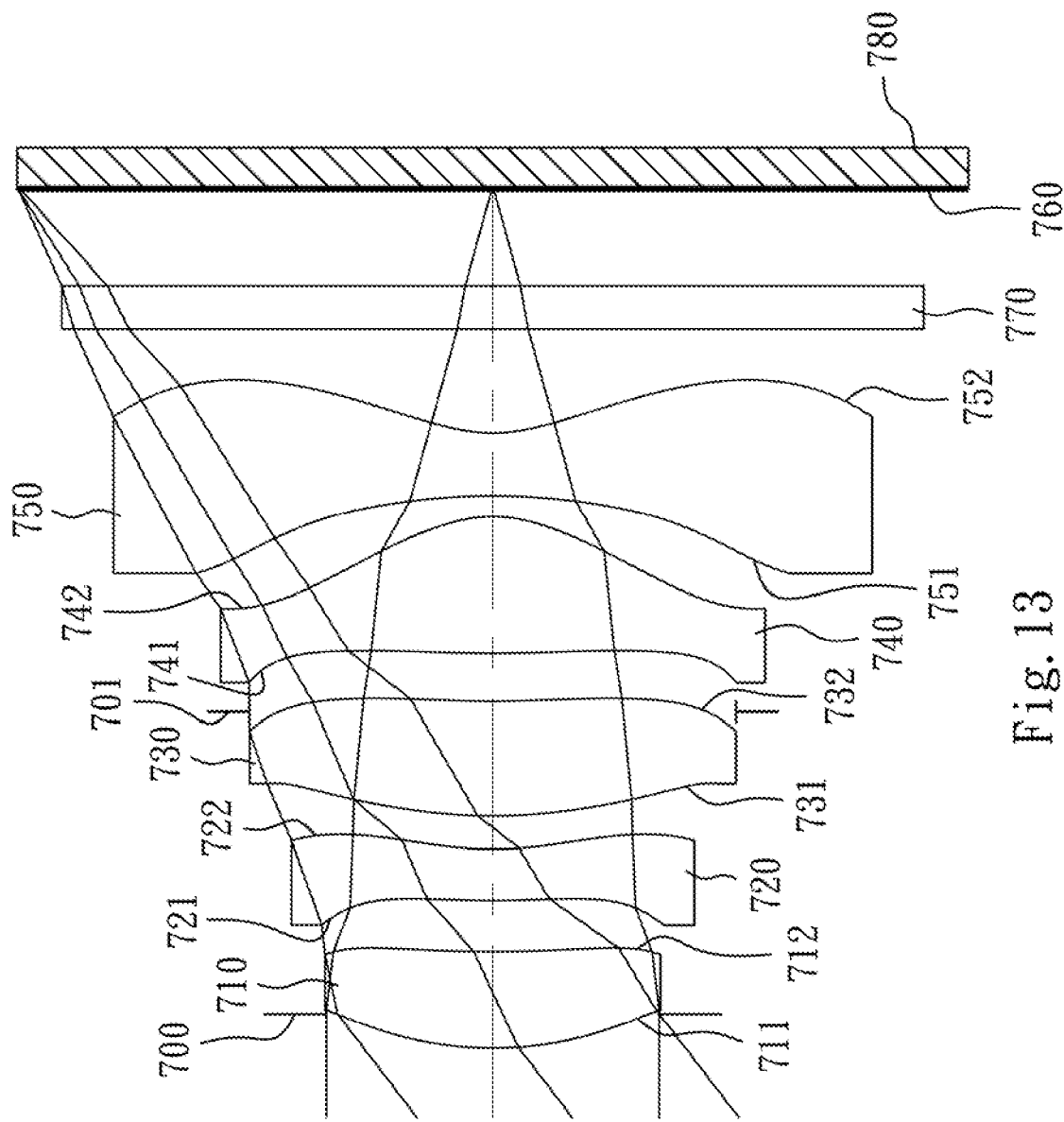
FIG. 13 is a schematic view of an image lens assembly according to the 7th embodiment of the present disclosure.
Figure 14:
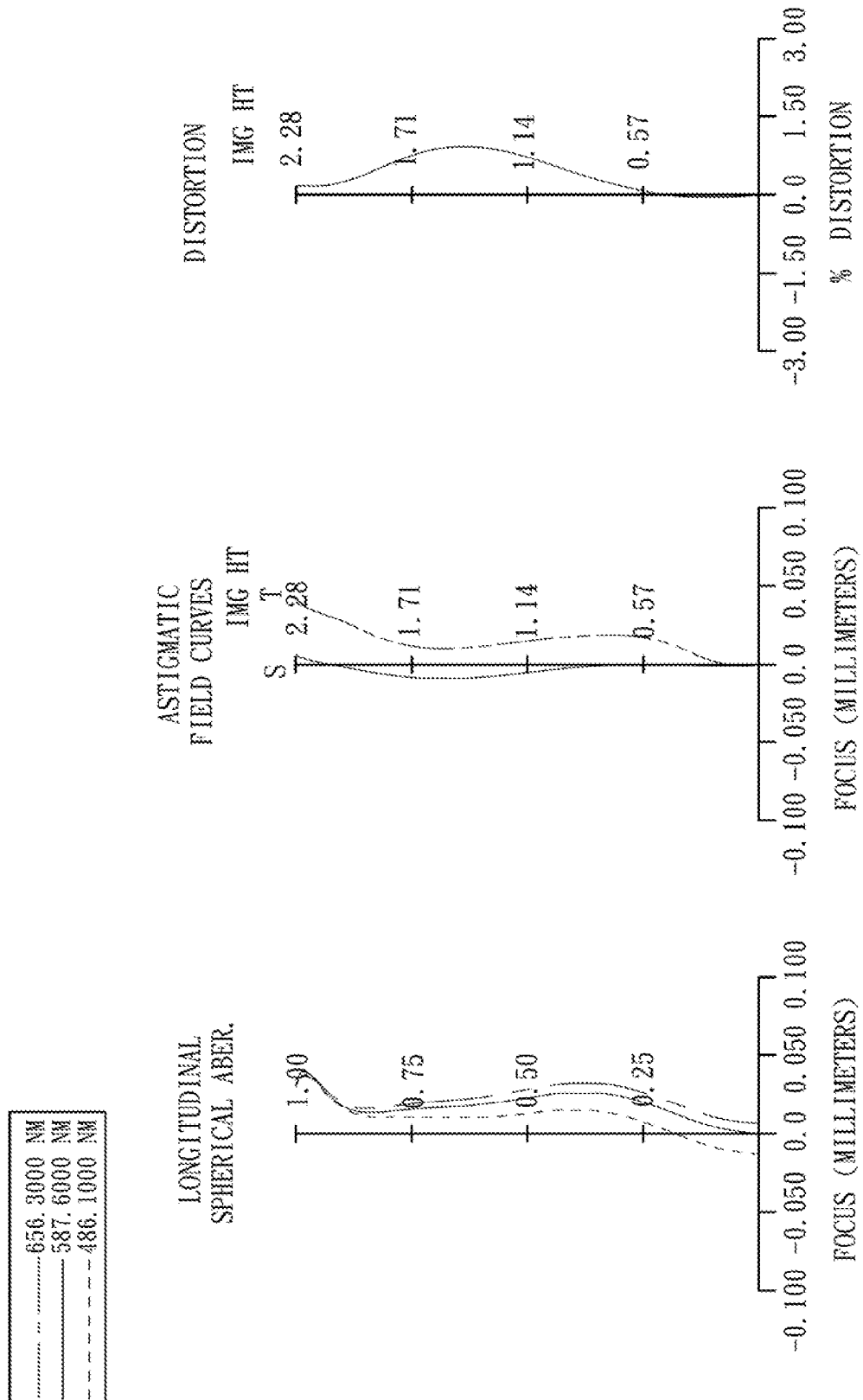
FIG. 14 shows spherical aberration curves, astigmatic field curves and a distortion curve of the image lens assembly according to the 7th embodiment.

FIG. 13 is a schematic view of an image lens assembly according to the 7th embodiment of the present disclosure. FIG. 14 shows spherical aberration curves, astigmatic field curves and a distortion curve of the image lens assembly according to the 7th embodiment. In FIG. 13, the image lens assembly includes, in order from an object side to an image side, an aperture stop 700, the first lens element 710, the second lens element 720, the third lens element 730, a stop 701, the fourth lens element 740, the fifth lens element 750, an IR cut filter 770, an image plane 760 and an image sensor 780.

The first lens element 710 with positive refractive power has a convex object-side surface 711 and a concave image-side surface 712, and is made of plastic material. The object-side surface 711 and the image-side surface 712 of the first lens element 710 are aspheric.

The second lens element 720 with negative refractive power has a convex object-side surface 721 and a concave image-side surface 722, and is made of plastic material. The object-side surface 721 and the image-side surface 722 of the second lens element 720 are aspheric.

The third lens element 730 with positive refractive power has a convex object-side surface 731 and a concave image-side surface 732, and is made of plastic material. The object-side surface 731 and the image-side surface 732 of the third lens element 730 are aspheric. Moreover, the third lens element 730 has inflection points formed on the object-side surface 731 and the image-side surface 732 thereof.

The fourth lens element 740 with positive refractive power has a convex object-side surface 741 and a convex image-side surface 742, and is made of plastic material. The object-side surface 741 and the image-side surface 742 of the fourth lens element 740 are aspheric. Moreover, the fourth lens element 740 has inflection points formed on the object-side surface 741 and the image-side surface 742 thereof. Additionally, the positive refractive power of the fourth lens element 740 decreases when moving away from the optical axis.

The fifth lens element 750 with negative refractive power has a concave object-side surface 751 and a concave image-side surface 752, and is made of plastic material. The object-side surface 751 and the image-side surface 752 of the fifth lens element 750 are aspheric. Moreover, the fifth lens element 750 has inflection points formed on the object-side surface 751 and the image-side surface 752 thereof. Additionally, the negative refractive power of the fifth lens element 750 decreases when moving away from the optical axis.

The IR cut filter 770 is made of glass and located between the fifth lens element 750 and the image plane 760, and will not affect the focal length of the image lens assembly.

The detailed optical data of the 7th embodiment are shown in Table 13 and the aspheric surface data are shown in Table 14 below.

TABLE 13

7th Embodiment
f = 2.96 mm, Fno = 1.85, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.165 | | | | |
| 2 | Lens 1 | 1.713150 (ASP) | 0.463 | Plastic | 1.544 | 55.9 | 4.47 |
| 3 | | 5.242200 (ASP) | 0.246 | | | | |
| 4 | Lens 2 | 3.994800 (ASP) | 0.250 | Plastic | 1.640 | 23.3 | −5.12 |
| 5 | | 1.755420 (ASP) | 0.158 | | | | |
| 6 | Lens 3 | 2.454100 (ASP) | 0.552 | Plastic | 1.544 | 55.9 | 8.16 |
| 7 | | 5.054900 (ASP) | −0.050 | | | | |
| 8 | Stop | Plano | 0.280 | | | | |
| 9 | Lens 4 | 5.521600 (ASP) | 0.659 | Plastic | 1.544 | 55.9 | 1.09 |
| 10 | | −0.634490 (ASP) | 0.101 | | | | |
| 11 | Lens 5 | −2.659790 (ASP) | 0.300 | Plastic | 1.544 | 55.9 | −1.02 |
| 12 | | 0.725640 (ASP) | 0.500 | | | | |
| 13 | IR-Filter | Plano | 0.210 | Glass | 1.517 | 64.2 | — |
| 14 | | Plano | 0.466 | | | | |
| 15 | Image | Plano | — | | | | |

Note:
Reference wavelength (d-line) is 587.6 nm.
Effective radius of the Surface 8 is 1.17 mm.

TABLE 14

Aspheric Coefficients

| Surface # | 2 | 3 | 4 | 5 | 6 |
|---|---|---|---|---|---|
| k = | 6.69402E−01 | 1.49374E+00 | −6.97816E−01 | −9.04691E+00 | −2.67634E+01 |
| A4 = | −4.30745E−02 | −1.06620E−01 | −4.43798E−01 | −2.19042E−01 | 7.30533E−02 |
| A6 = | 1.52318E−01 | −2.70935E−02 | 2.39182E−01 | 2.16119E−01 | −3.38943E−02 |
| A8 = | −5.42069E−01 | 6.78139E−02 | −5.56497E−01 | −3.19471E−01 | 1.04025E−02 |
| A10 = | 6.83685E−01 | −6.67781E−01 | 4.97710E−01 | 1.17582E−01 | 7.32150E−03 |
| A12 = | −2.10593E−01 | 8.08653E−01 | −8.01276E−01 | 1.04335E−01 | −6.73669E−02 |
| A14 = | −3.04361E−01 | −4.22779E−01 | 7.42171E−01 | −8.53200E−02 | 6.64120E−02 |
| A16 = | −4.31573E−06 | 8.67278E−07 | −1.06213E−03 | 2.11128E−02 | −2.59997E−02 |

| Surface # | 7 | 9 | 10 | 11 | 12 |
|---|---|---|---|---|---|
| k = | −1.98788E+01 | 1.85416E+01 | −4.18036E+00 | −4.73117E+01 | −6.92098E+00 |
| A4 = | −2.23201E−01 | −2.69415E−01 | −1.20586E−01 | −7.00500E−02 | −9.27350E−02 |
| A6 = | 3.18980E−01 | 3.83592E−01 | 1.68423E−01 | −3.84554E−01 | 3.21837E−02 |
| A8 = | −4.20751E−01 | −4.01329E−01 | −4.99316E−02 | 2.86170E−02 | −1.03832E−02 |
| A10 = | 2.74685E−01 | 2.20166E−01 | 4.91107E−03 | −7.02604E−03 | 1.85839E−03 |
| A12 = | −3.68853E−02 | −7.70003E−02 | −7.46078E−04 | 4.85138E−03 | −1.70501E−04 |
| A14 = | −5.89844E−02 | 6.27217E−03 | 7.79281E−05 | −1.32030E−03 | 6.16966E−06 |
| A16 = | 2.20257E−02 | | | | |

In the image lens assembly according to the 7th embodiment, the definitions of f, FOV, V1, V2, EPD, CT2, CT3, SL, TTL and ImgH are the same as those stated in the 1st embodiment with corresponding values for the 7th embodiment. Moreover, these parameters can be calculated from Table 13 and Table 14 as the following values and satisfy the following relationships:

| | |
|---|---|
| f (mm) | 2.96 |
| FOV (deg.) | 75.0 |
| V1 − V2 | 32.6 |
| f/EPD | 1.85 |
| EPD/CT2 | 6.40 |
| CT2/CT3 | 0.45 |
| SL/TTL | 0.96 |
| TTL/ImgH | 1.78 |

8th Embodiment

Figure 15:
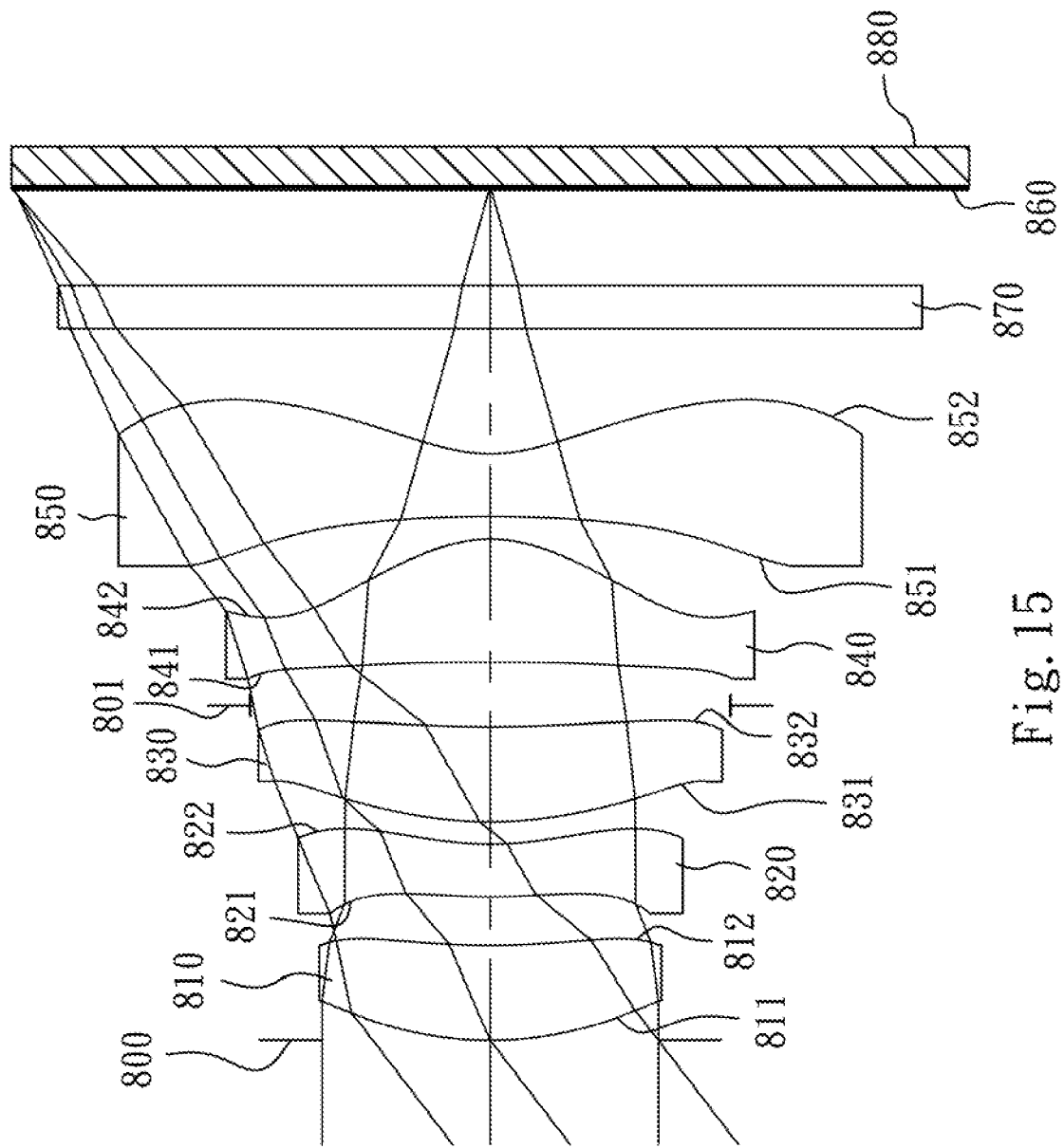
FIG. 15 is a schematic view of an image lens assembly according to the 8th embodiment of the present disclosure.
Figure 16:
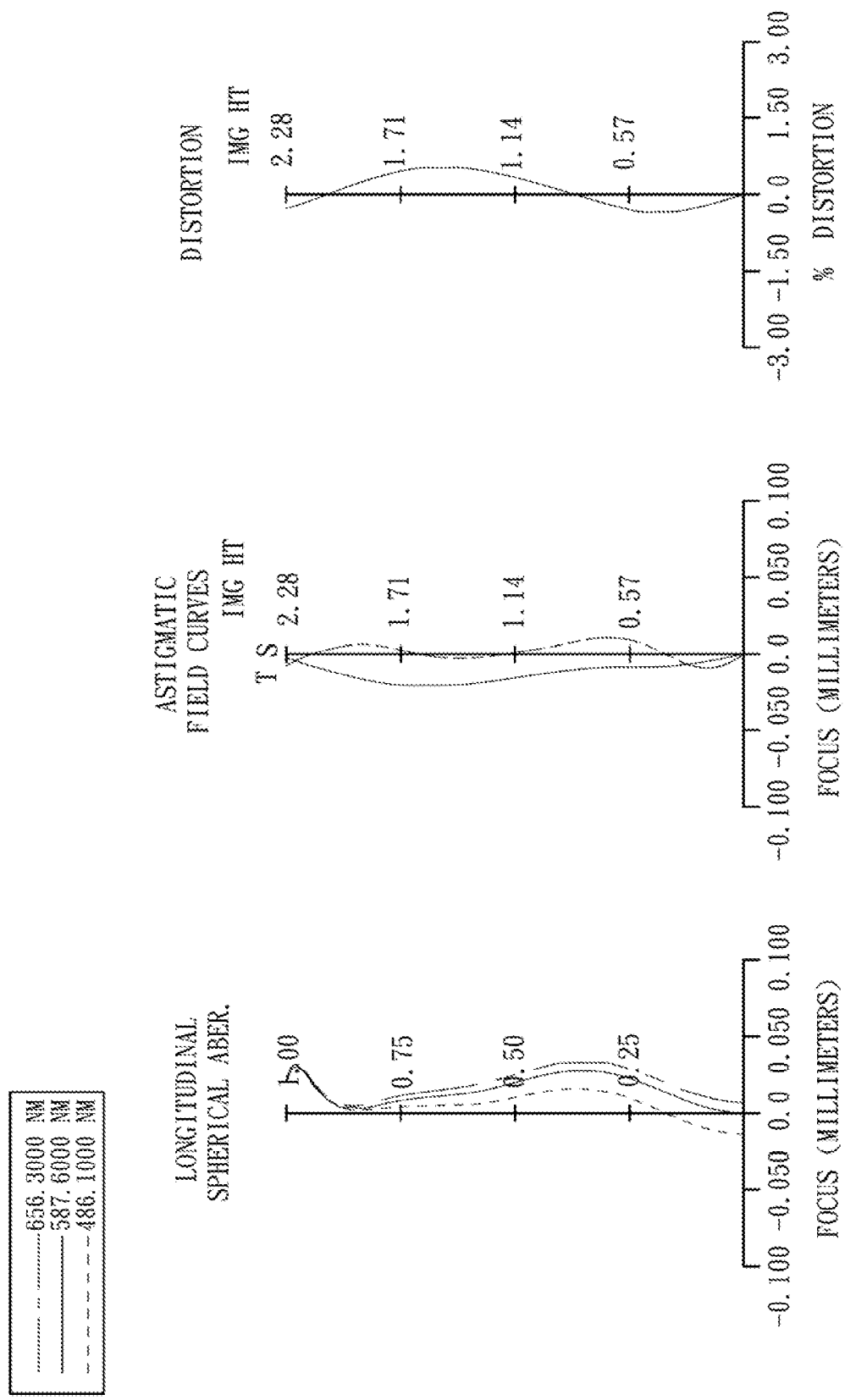
FIG. 16 shows spherical aberration curves, astigmatic field curves and a distortion curve of the image lens assembly according to the 8th embodiment.

FIG. 15 is a schematic view of an image lens assembly according to the 8th embodiment of the present disclosure. FIG. 16 shows spherical aberration curves, astigmatic field curves and a distortion curve of the image lens assembly according to the 8th embodiment. In FIG. 15, the image lens assembly includes, in order from an object side to an image side, an aperture stop 800, the first lens element 810, the second lens element 820, the third lens element 830, a stop 801, the fourth lens element 840, the fifth lens element 850, an IR cut filter 870, an image plane 860 and an image sensor 880.

The first lens element 810 with positive refractive power has a convex object-side surface 811 and a concave image-side surface 812, and is made of plastic material. The object-side surface 811 and the image-side surface 812 of the first lens element 810 are aspheric.

The second lens element 820 with negative refractive power has a convex object-side surface 821 and a concave image-side surface 822, and is made of plastic material. The object-side surface 821 and the image-side surface 822 of the second lens element 820 are aspheric.

The third lens element 830 with positive refractive power has a convex object-side surface 831 and a concave image-side surface 832, and is made of plastic material. The object-side surface 831 and the image-side surface 832 of the third lens element 830 are aspheric. Moreover, the third lens element 830 has inflection points formed on the object-side surface 831 and the image-side surface 832 thereof.

The fourth lens element 840 with positive refractive power has a concave object-side surface 841 and a convex image-side surface 842, and is made of plastic material. The object-side surface 841 and the image-side surface 842 of the fourth lens element 840 are aspheric. Moreover, the fourth lens element 840 has inflection points formed on the object-side surface 841 and the image-side surface 842 thereof. Additionally, the positive refractive power of the fourth lens element 840 decreases when moving away from the optical axis.

The fifth lens element 850 with negative refractive power has a concave object-side surface 851 and a concave image-side surface 852, and is made of plastic material. The object-side surface 851 and the image-side surface 852 of the fifth lens element 850 are aspheric. Moreover, the fifth lens element 850 has inflection points formed on the object-side surface 851 and the image-side surface 852 thereof. Additionally, the negative refractive power of the fifth lens element 850 decreases when moving away from the optical axis.

The IR cut filter 870 is made of glass and located between the fifth lens element 850 and the image plane 860, and will not affect the focal length of the image lens assembly.

The detailed optical data of the 8th embodiment are shown in Table 15 and the aspheric surface data are shown in Table 16 below.

TABLE 15

8th Embodiment
f = 2.98 mm, Fno = 1.85, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.000 | | | | |
| 2 | Lens 1 | 1.688710 (ASP) | 0.455 | Plastic | 1.544 | 55.9 | 5.50 |
| 3 | | 3.504500 (ASP) | 0.235 | | | | |
| 4 | Lens 2 | 2.902210 (ASP) | 0.250 | Plastic | 1.640 | 23.3 | −5.04 |
| 5 | | 1.476020 (ASP) | 0.107 | | | | |
| 6 | Lens 3 | 1.862850 (ASP) | 0.458 | Plastic | 1.544 | 55.9 | 4.99 |
| 7 | | 5.422300 (ASP) | 0.100 | | | | |
| 8 | Stop | Plano | 0.208 | | | | |
| 9 | Lens 4 | −100.000000 (ASP) | 0.590 | Plastic | 1.544 | 55.9 | 1.17 |
| 10 | | −0.636060 (ASP) | 0.108 | | | | |
| 11 | Lens 5 | −5.718300 (ASP) | 0.300 | Plastic | 1.544 | 55.9 | −1.14 |
| 12 | | 0.705710 (ASP) | 0.600 | | | | |
| 13 | IR-Filter | Plano | 0.210 | Glass | 1.517 | 64.2 | — |
| 14 | | Plano | 0.466 | | | | |
| 15 | Image | Plano | — | | | | |

Note:
Reference wavelength (d-line) is 587.6 nm.
Effective radius of the Surface 8 is 1.15 mm.

TABLE 16

Aspheric Coefficients

| Surface # | 2 | 3 | 4 | 5 | 6 |
|---|---|---|---|---|---|
| k = | 5.59907E−01 | 2.15122E+00 | −3.49714E+01 | −9.40190E+00 | −1.84086E+01 |
| A4 = | −4.44885E−02 | −1.33603E−01 | −3.56266E−01 | −2.19450E−01 | 1.26440E−01 |
| A6 = | 1.60396E−01 | −6.24083E−02 | 2.30232E−02 | 1.50838E−01 | −1.09213E−01 |
| A8 = | −5.55924E−01 | 1.37157E−01 | −4.36882E−01 | −3.34141E−01 | 9.56915E−02 |
| A10 = | 6.68507E−01 | −7.55450E−01 | 6.55596E−01 | 2.20604E−01 | −7.01806E−02 |
| A12 = | −8.34414E−02 | 7.66066E−01 | −1.41765E+00 | −2.30381E−02 | −1.24315E−02 |
| A14 = | −4.06262E−01 | −2.75276E−01 | 1.21633E+00 | −6.08169E−02 | 4.52580E−02 |
| A16 = | 8.36050E−04 | −8.59993E−02 | 4.48387E−03 | 4.32596E−02 | −3.53355E−02 |

| Surface # | 7 | 9 | 10 | 11 | 12 |
|---|---|---|---|---|---|
| k = | 1.96492E+01 | −5.00000E+01 | −3.84806E+00 | −8.79617E+01 | −6.65457E+00 |
| A4 = | −1.94658E−01 | −2.41034E−01 | −1.70728E−01 | −5.21957E−03 | −9.82244E−02 |
| A6 = | 4.04907E−01 | 5.59103E−01 | 2.67588E−01 | −8.07490E−02 | 3.71475E−02 |
| A8 = | −6.83638E−01 | −5.42483E−01 | −2.43507E−02 | 4.99541E−02 | −1.32978E−02 |
| A10 = | 5.40279E−01 | 2.24906E−01 | −4.02488E−02 | −1.23464E−02 | 2.81555E−03 |
| A12 = | −2.98941E−02 | −2.36051E−02 | 7.79663E−03 | 3.99924E−03 | −3.31280E−04 |
| A14 = | −2.20370E−01 | −7.14655E−03 | 5.06528E−04 | −1.13683E−03 | 1.24456E−05 |
| A16 = | 8.54483E−02 | −1.46717E−03 | −1.24467E−04 | 7.66664E−05 | |

In the image lens assembly according to the 8th embodiment, the definitions of f, FOV, V1, V2, EPD, CT2, CT3, SL, TTL and ImgH are the same as those stated in the 1st embodiment with corresponding values for the 8th embodiment. Moreover, these parameters can be calculated from Table 15 and Table 16 as the following values and satisfy the following relationships:

| | |
|---|---|
| f (mm) | 2.98 |
| FOV (deg.) | 75.0 |
| V1 − V2 | 32.6 |
| f/EPD | 1.85 |
| EPD/CT2 | 6.44 |
| CT2/CT3 | 0.55 |
| SL/TTL | 1.00 |
| TTL/ImgH | 1.76 |

9th Embodiment

Figure 17:
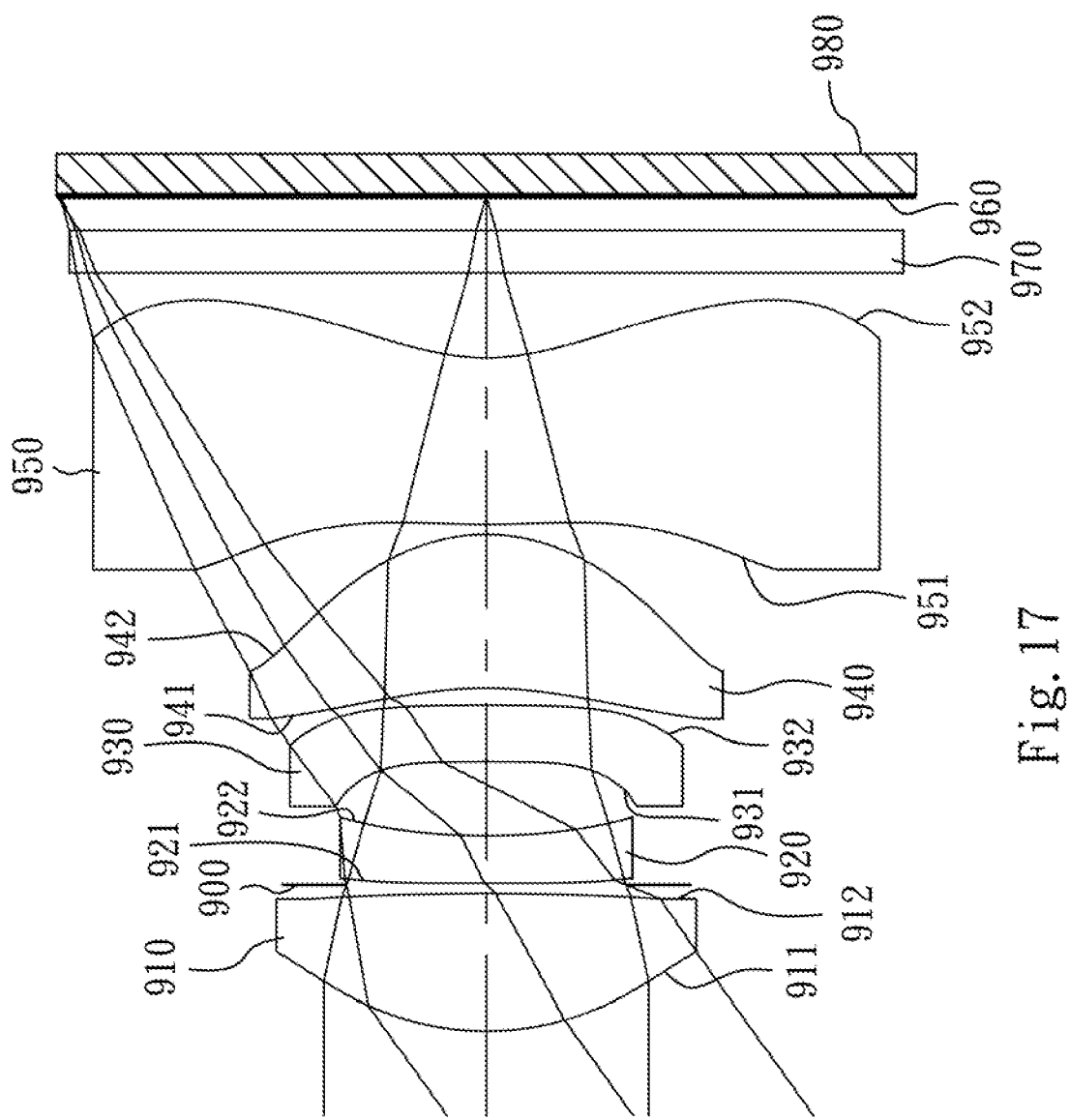
FIG. 17 is a schematic view of an image lens assembly according to the 9th embodiment of the present disclosure.
Figure 18:
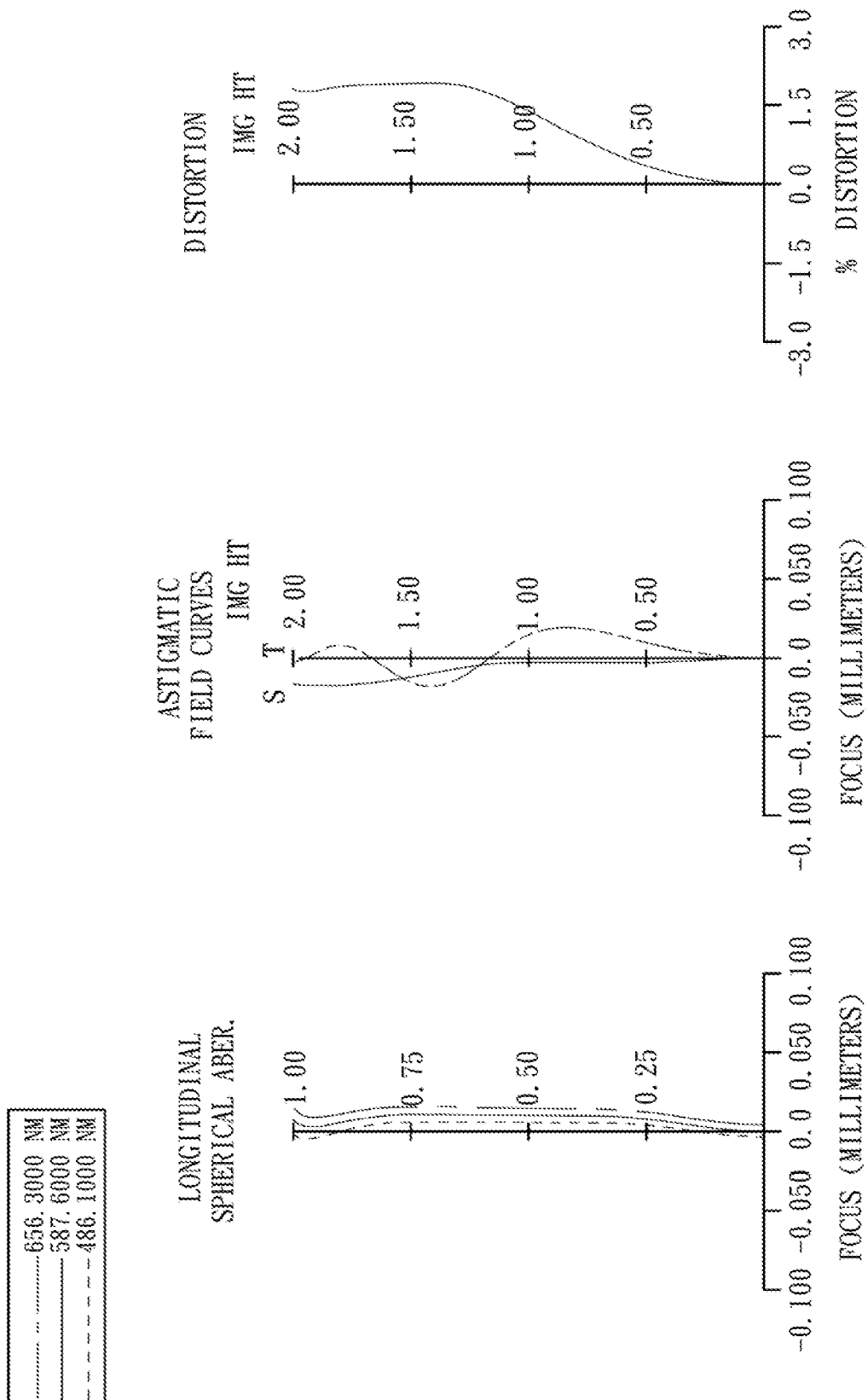
FIG. 18 shows spherical aberration curves, astigmatic field curves and a distortion curve of the image lens assembly according to the 9th embodiment.

FIG. 17 is a schematic view of an image lens assembly according to the 9th embodiment of the present disclosure. FIG. 18 shows spherical aberration curves, astigmatic field curves and a distortion curve of the image lens assembly according to the 9th embodiment. In FIG. 17, the image lens assembly includes, in order from an object side to an image side, the first lens element 910, an aperture stop 900, the second lens element 920, the third lens element 930, the fourth lens element 940, the fifth lens element 950, an IR cut filter 970, an image plane 960 and an image sensor 980.

The first lens element 910 with positive refractive power has a convex object-side surface 911 and a convex image-side surface 912, and is made of plastic material. The object-side surface 911 and the image-side surface 912 of the first lens element 910 are aspheric.

The second lens element 920 with negative refractive power has a concave object-side surface 921 and a concave image-side surface 922, and is made of plastic material. The object-side surface 921 and the image-side surface 922 of the second lens element 920 are aspheric.

The third lens element 930 with negative refractive power has a concave object-side surface 931 and a convex image-side surface 932, and is made of plastic material. The object-side surface 931 and the image-side surface 932 of the third lens element 930 are aspheric.

The fourth lens element 940 with positive refractive power has a concave object-side surface 941 and a convex image-side surface 942, and is made of plastic material. The object-side surface 941 and the image-side surface 942 of the fourth lens element 940 are aspheric. Moreover, the fourth lens element 940 has inflection points formed on the object-side surface 941 and the image-side surface 942 thereof. Additionally, the positive refractive power of the fourth lens element 940 decreases when moving away from the optical axis.

The fifth lens element 950 with negative refractive power has a convex object-side surface 951 and a concave image-side surface 952, and is made of plastic material. The object-side surface 951 and the image-side surface 952 of the fifth lens element 950 are aspheric. Moreover, the fifth lens element 950 has inflection points formed on the object-side surface 951 and the image-side surface 952 thereof. Additionally, the negative refractive power of the fifth lens element 950 decreases when moving away from the optical axis.

The IR cut filter 970 is made of glass and located between the fifth lens element 950 and the image plane 960, and will not affect the focal length of the image lens assembly.

The detailed optical data of the 9th embodiment are shown in Table 17 and the aspheric surface data are shown in Table 18 below.

TABLE 17

9th Embodiment
f = 2.75 mm, Fno = 1.80, HFOV = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.337930 (ASP) | 0.648 | Plastic | 1.544 | 55.9 | 2.17 |
| 2 | | −8.478100 (ASP) | 0.040 | | | | |
| 3 | Ape. Stop | Plano | 0.008 | | | | |
| 4 | Lens 2 | −89.285700 (ASP) | 0.220 | Plastic | 1.650 | 21.4 | −4.47 |
| 5 | | 3.006800 (ASP) | 0.352 | | | | |
| 6 | Lens 3 | −14.757200 (ASP) | 0.262 | Plastic | 1.650 | 21.4 | −61.40 |
| 7 | | −23.584900 (ASP) | 0.080 | | | | |
| 8 | Lens 4 | −1.943670 (ASP) | 0.723 | Plastic | 1.544 | 55.9 | 2.48 |
| 9 | | −0.900430 (ASP) | 0.050 | | | | |
| 10 | Lens 5 | 4.439500 (ASP) | 0.780 | Plastic | 1.535 | 56.3 | −2.68 |
| 11 | | 1.017010 (ASP) | 0.400 | | | | |
| 12 | IR-Filter | Plano | 0.200 | Glass | 1.517 | 64.2 | — |
| 13 | | Plano | 0.163 | | | | |
| 14 | Image | Plano | — | | | | |

Note:
Reference wavelength (d-line) is 587.6 nm.

TABLE 18

Aspheric Coefficients

| Surface # | 1 | 2 | 4 | 5 | 6 |
|---|---|---|---|---|---|
| k = | −8.66707E+00 | 1.15815E+01 | −1.00000E+00 | −3.65037E+01 | −1.00000E+00 |
| A4 = | 4.32613E−01 | 1.30961E−01 | 1.69085E−01 | 2.06113E−01 | −5.05007E−01 |
| A6 = | −6.31533E−01 | −9.34124E−02 | −2.06156E−01 | −4.27217E−01 | 5.37283E−01 |

TABLE 18-continued

| Aspheric Coefficients | | | | | |
|---|---|---|---|---|---|
| A8 = | 8.21330E−01 | −7.89523E−01 | 3.12027E−01 | 1.13699E+00 | −4.77152E+00 |
| A10 = | −5.21774E−01 | 2.22488E+00 | −1.57849E+00 | −2.35019E+00 | 1.01887E+01 |
| A12 = | −1.28512E−01 | −2.41966E+00 | 5.18913E+00 | 2.95508E+00 | −1.10728E+01 |
| A14 = | 1.81984E−01 | 1.01270E+00 | −4.51671E+00 | −1.14527E+00 | 1.60455E−07 |
| A16 = | | | | | 4.00880E+00 |

| Surface # | 7 | 8 | 9 | 10 | 11 |
|---|---|---|---|---|---|
| k = | −1.00000E+00 | −2.04866E+01 | −2.40466E+00 | −9.00000E+01 | −4.20854E+00 |
| A4 = | −2.69257E−01 | −2.10799E−01 | −3.39697E−01 | −2.82656E−01 | −1.71092E−01 |
| A6 = | 8.39095E−01 | 8.63108E−01 | 4.07258E−01 | 1.77008E−01 | 1.39035E−01 |
| A8 = | −3.47625E+00 | −1.44780E+00 | −5.38344E−01 | −2.45778E−02 | −8.14918E−02 |
| A10 = | 7.56118E+00 | 1.16020E+00 | 4.54351E−01 | −3.95399E−02 | 2.85695E−02 |
| A12 = | −9.89441E+00 | −3.88497E−01 | −1.67212E−01 | 2.43008E−02 | −5.59847E−03 |
| A14 = | 7.03783E+00 | 3.04449E−02 | 3.27626E−02 | −4.03954E−03 | 4.58135E−04 |
| A16 = | −2.02948E+00 | | | | |

In the image lens assembly according to the 9th embodiment, the definitions of f, FOV, V1, V2, EPD, CT2, CT3, SL, TTL and ImgH are the same as those stated in the 1st embodiment with corresponding values for the 9th embodiment. Moreover, these parameters can be calculated from Table 17 and Table 18 as the following values and satisfy the following relationships:

| | |
|---|---|
| f (mm) | 2.75 |
| FOV (deg.) | 71.0 |
| V1 − V2 | 34.5 |
| f/EPD | 1.80 |
| EPD/CT2 | 6.93 |
| CT2/CT3 | 0.84 |
| SL/TTL | 0.82 |
| TTL/ImgH | 1.93 |

10th Embodiment

Figure 19:
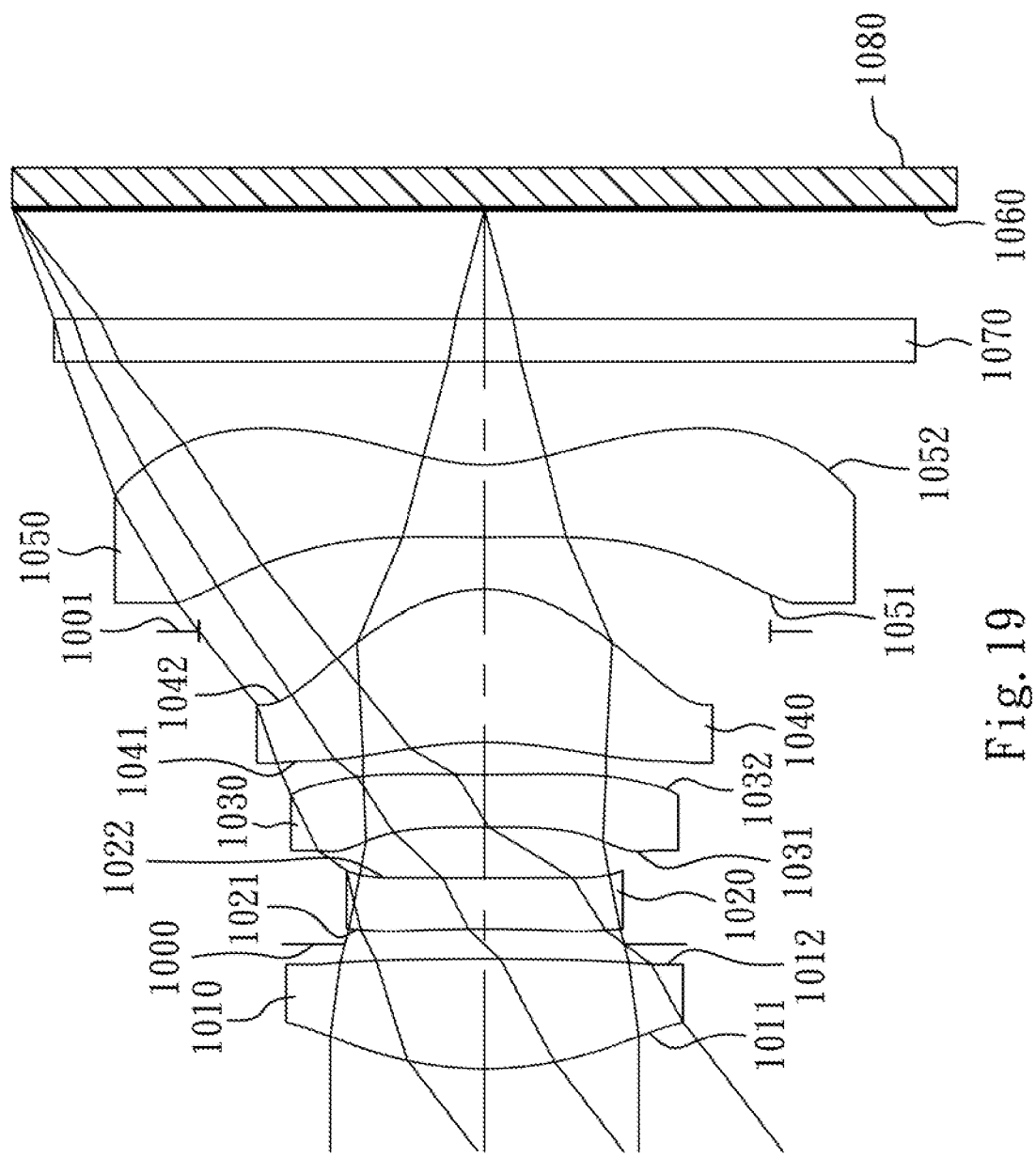
FIG. 19 is a schematic view of an image lens assembly according to the 10th embodiment of the present disclosure.
Figure 20:
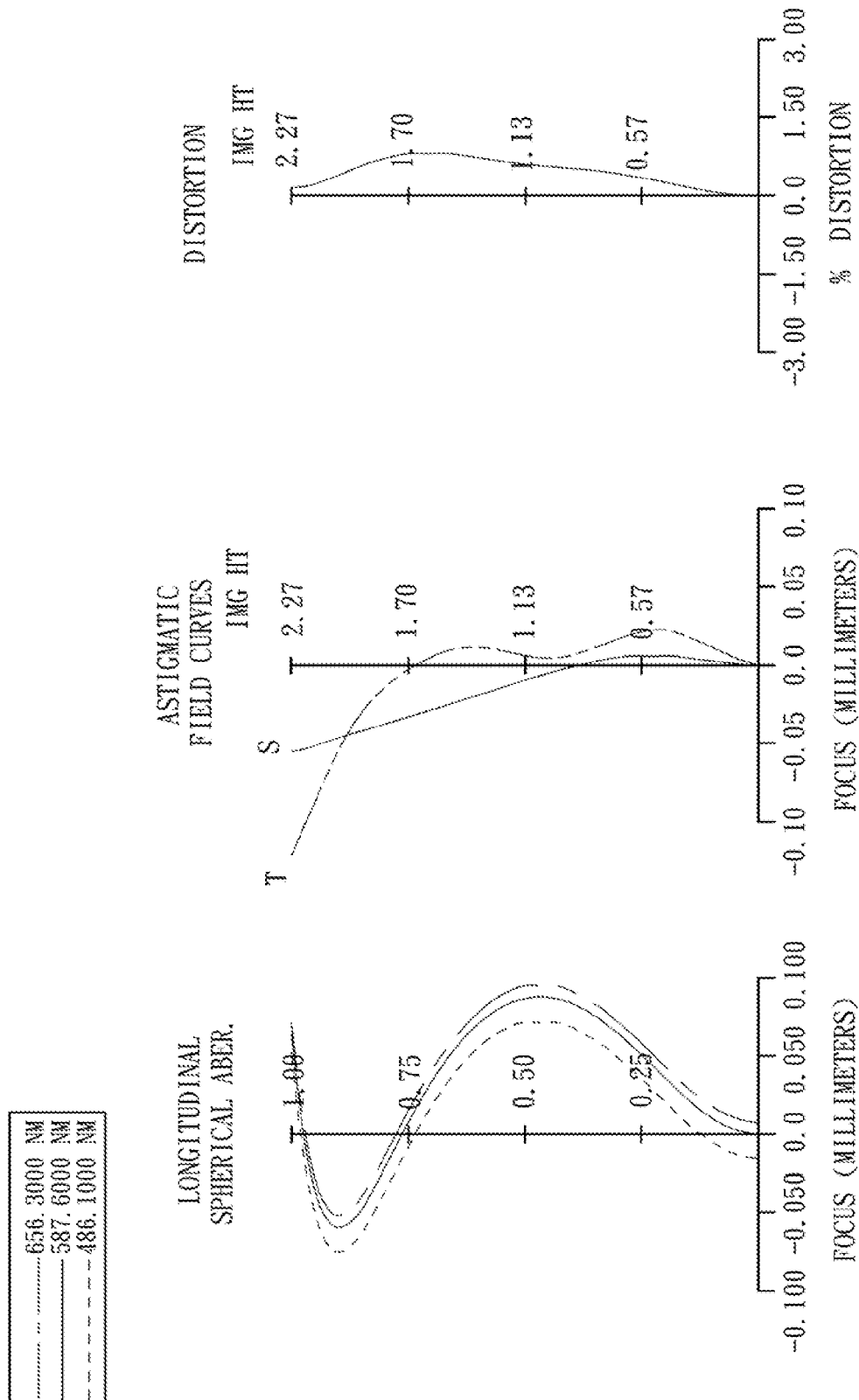
FIG. 20 shows spherical aberration curves, astigmatic field curves and a distortion curve of the image lens assembly according to the 10th embodiment.

FIG. 19 is a schematic view of an image lens assembly according to the 10th embodiment of the present disclosure. FIG. 20 shows spherical aberration curves, astigmatic field curves and a distortion curve of the image lens assembly according to the 10th embodiment. In FIG. 19, the image lens assembly includes, in order from an object side to an image side, the first lens element 1010, an aperture stop 1000, the second lens element 1020, the third lens element 1030, the fourth lens element 1040, a stop 1001, the fifth lens element 1050, an IR cut filter 1070, an image plane 1060 and an image sensor 1080.

The first lens element 1010 with positive refractive power has a convex object-side surface 1011 and a convex image-side surface 1012, and is made of plastic material. The object-side surface 1011 and the image-side surface 1012 of the first lens element 1010 are aspheric.

The second lens element 1020 with negative refractive power has a concave object-side surface 1021 and a concave image-side surface 1022, and is made of plastic material. The object-side surface 1021 and the image-side surface 1022 of the second lens element 1020 are aspheric.

The third lens element 1030 with negative refractive power has a concave object-side surface 1031 and a concave image-side surface 1032, and is made of plastic material. The object-side surface 1031 and the image-side surface 1032 of the third lens element 1030 are aspheric. Moreover, the third lens element 1030 has inflection points formed on the object-side surface 1031 and the image-side surface 1032 thereof.

The fourth lens element 1040 with positive refractive power has a concave object-side surface 1041 and a convex image-side surface 1042, and is made of plastic material. Moreover, the fourth lens element 1040 has inflection points formed on the object-side surface 1041 and the image-side surface 1042 thereof. Additionally, the positive refractive power of the fourth lens element 1040 decreases when moving away from the optical axis.

The fifth lens element 1050 with negative refractive power has a convex object-side surface 1051 and a concave image-side surface 1052, and is made of plastic material. The object-side surface 1051 and the image-side surface 1052 of the fifth lens element 1050 are aspheric. Moreover, the fifth lens element 1050 has inflection points formed on the object-side surface 1051 and the image-side surface 1052 thereof. Additionally, the negative refractive power of the fifth lens element 1050 decreases when moving away from the optical axis.

The IR cut filter 1070 is made of glass and located between the fifth lens element 1050 and the image plane 1060, and will not affect the focal length of the image lens assembly.

The detailed optical data of the 10th embodiment are shown in Table 19 and the aspheric surface data are shown in Table 20 below.

TABLE 19

10th Embodiment
f = 2.89 mm, Fno = 1.94, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.740880 (ASP) | 0.532 | Plastic | 1.544 | 55.9 | 2.81 |
| 2 | | −11.140000 (ASP) | 0.071 | | | | |
| 3 | Ape. Stop | Plano | 0.073 | | | | |

TABLE 19-continued

10th Embodiment
f = 2.89 mm, Fno = 1.94, HFOV = 37.6 deg.

| Surface # | | Curvature Radius | Thickness | Material | Index | Abbe # | Focal length |
|---|---|---|---|---|---|---|---|
| 4 | Lens 2 | −6.662000 (ASP) | 0.250 | Plastic | 1.640 | 23.3 | −9.57 |
| 5 | | 77.240100 (ASP) | 0.243 | | | | |
| 6 | Lens 3 | −28.917200 (ASP) | 0.257 | Plastic | 1.640 | 23.3 | −10.75 |
| 7 | | 9.060300 (ASP) | 0.156 | | | | |
| 8 | Lens 4 | −1.973650 (ASP) | 0.738 | Plastic | 1.544 | 55.9 | 1.52 |
| 9 | | −0.658860 (ASP) | −0.200 | | | | |
| 10 | Stop | Plano | 0.453 | | | | |
| 11 | Lens 5 | 14.779600 (ASP) | 0.349 | Plastic | 1.544 | 55.9 | −1.75 |
| 12 | | 0.888360 (ASP) | 0.500 | | | | |
| 13 | IR-Filter | Plano | 0.210 | Glass | 1.517 | 64.2 | — |
| 14 | | Plano | 0.531 | | | | |
| 15 | Image | Plano | — | | | | |

Note:
Reference wavelength (d-line) is 587.6 nm.
Effective radius of the Surface 10 is 1.38 mm.

TABLE 20

Aspheric Coefficients

| Surface # | 1 | 2 | 4 | 5 | 6 |
|---|---|---|---|---|---|
| k = | −1.76415E+01 | 3.54324E+01 | −5.29696E+01 | −1.00000E+00 | 9.00000E+01 |
| A4 = | 3.67283E−01 | 9.11716E−02 | 9.88691E−02 | 1.03367E−02 | −6.32967E−01 |
| A6 = | −6.47852E−01 | −1.32450E−01 | −1.18570E−01 | −4.04255E−01 | 6.78443E−01 |
| A8 = | 8.17362E−01 | −3.87328E−01 | 1.15808E+00 | 1.83443E+00 | −5.48996E+00 |
| A10 = | −5.35634E−01 | 1.60057E+00 | −2.23938E+00 | −1.64608E+00 | 1.49788E+01 |
| A12 = | −1.14405E−01 | −2.45391E+00 | 6.11183E+00 | 7.64011E+00 | −9.31421E+00 |
| A14 = | 1.88678E−01 | 1.42842E+00 | −8.77038E+00 | −1.05961E+01 | −1.53332E+00 |

| Surface # | 7 | 8 | 9 | 11 | 12 |
|---|---|---|---|---|---|
| k = | 5.11356E+01 | −2.23229E+01 | −3.00739E+00 | 1.28941E+01 | −6.91506E+00 |
| A4 = | −3.11814E−01 | −1.87236E−01 | −3.95258E−01 | −2.52334E−01 | −2.01644E−01 |
| A6 = | 7.10853E−01 | 8.89085E−01 | 4.48999E−01 | 1.57050E−01 | 1.51910E−01 |
| A8 = | −3.14527E+00 | −1.44355E+00 | −4.76269E−01 | −2.73573E−02 | −8.52881E−02 |
| A10 = | 7.67516E+00 | 1.20428E+00 | 4.91178E−01 | −3.84524E−02 | 2.87347E−02 |
| A12 = | −1.00306E+01 | −3.80448E−01 | −1.63678E−01 | 2.50151E−02 | −5.56039E−03 |
| A14 = | 6.90652E+00 | −3.95610E−02 | | −4.24689E−03 | 4.69544E−04 |
| A16 = | −2.03403E+00 | | | | |

In the image lens assembly according to the 10th embodiment, the definitions of f, FOV, V1, V2, EPD, CT2, CT3, SL, TTL and ImgH are the same as those stated in the 1st embodiment with corresponding values for the 10th embodiment. Moreover, these parameters can be calculated from Table 19 and Table 20 as the following values and satisfy the following relationships:

| | |
|---|---|
| f (mm) | 2.89 |
| FOV (deg.) | 75.2 |
| V1 − V2 | 32.6 |
| f/EPD | 1.94 |
| EPD/CT2 | 5.96 |
| CT2/CT3 | 0.97 |
| SL/TTL | 0.85 |
| TTL/ImgH | 1.80 |

11th Embodiment

Figure 21:
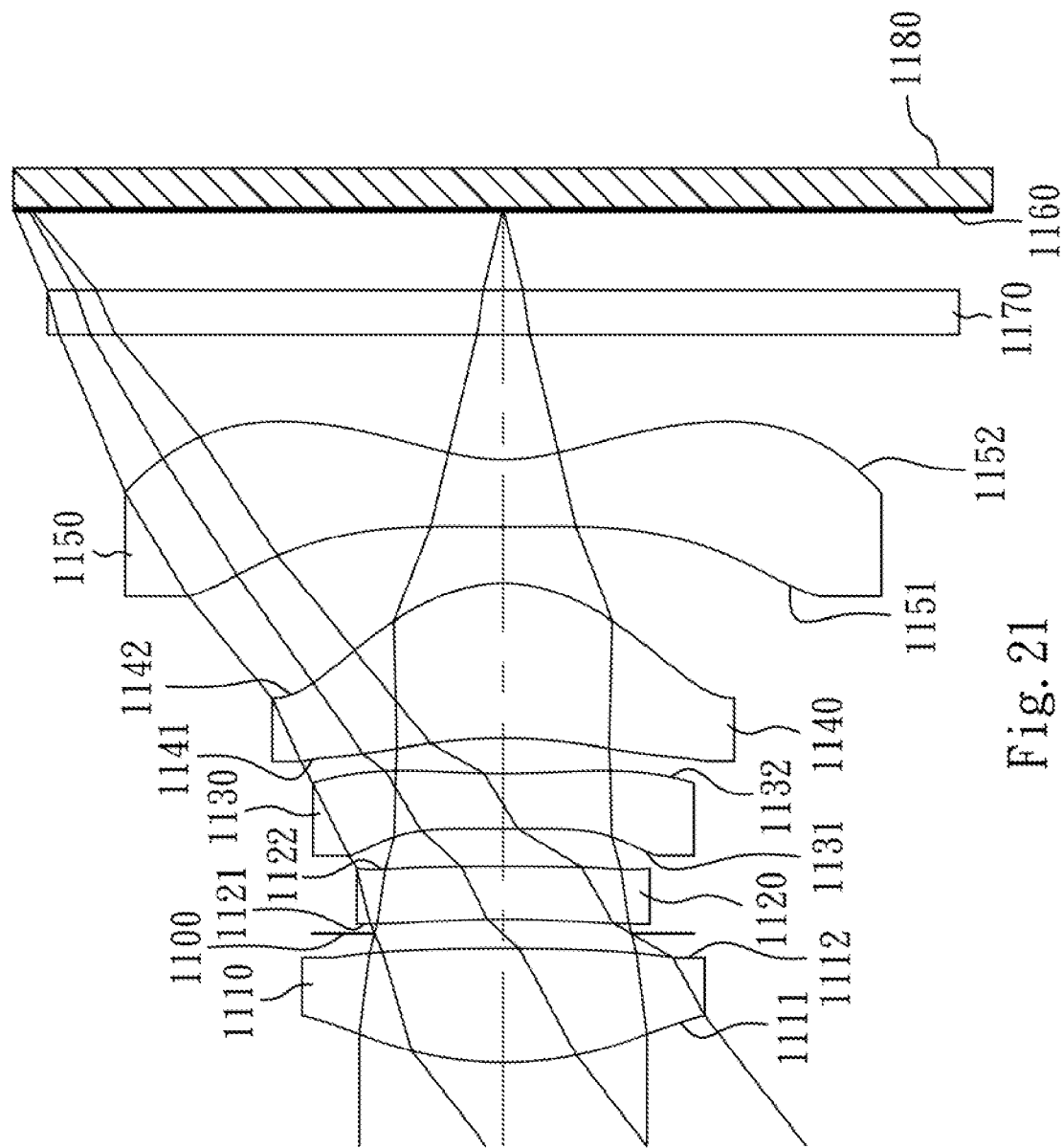
FIG. 21 is a schematic view of an image lens assembly according to the 11th embodiment of the present disclosure.
Figure 22:
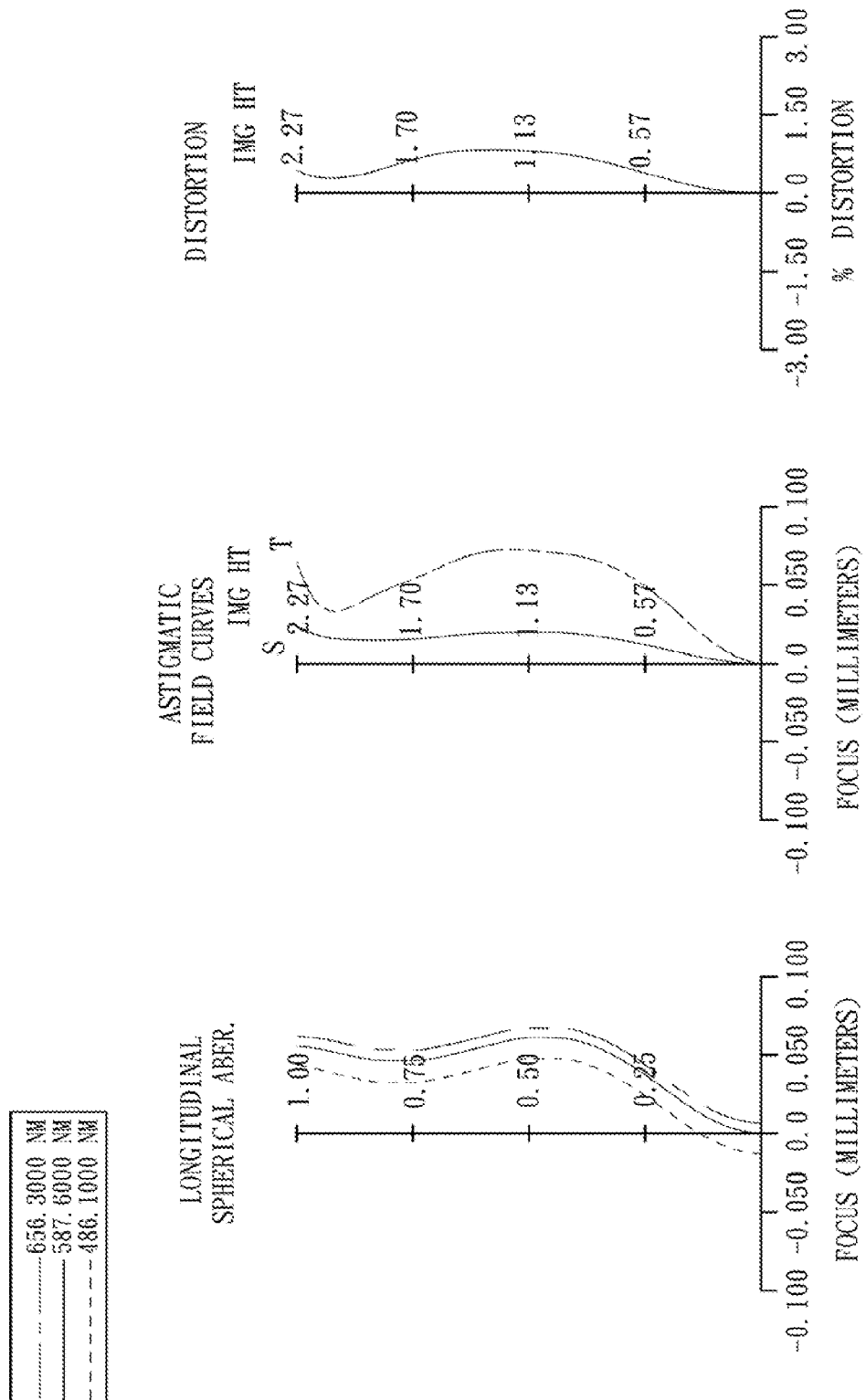
FIG. 22 shows spherical aberration curves, astigmatic field curves and a distortion curve of the image lens assembly according to the 11th embodiment.

FIG. 21 is a schematic view of an image lens assembly according to the 11th embodiment of the present disclosure. FIG. 22 shows spherical aberration curves, astigmatic field curves and a distortion curve of the image lens assembly according to the 11th embodiment. In FIG. 21, the image lens assembly includes, in order from an object side to an image side, the first lens element 1110, an aperture stop 1100, the second lens element 1120, the third lens element 1130, the fourth lens element 1140, the fifth lens element 1150, an IR cut filter 1170, an image plane 1160 and an image sensor 1180.

The first lens element 1110 with positive refractive power has a convex object-side surface 1111 and a convex image-side surface 1112, and is made of plastic material. The object-side surface 1111 and the image-side surface 1112 of the first lens element 1110 are aspheric.

The second lens element 1120 with negative refractive power has a concave object-side surface 1121 and a convex image-side surface 1122, and is made of plastic material. The object-side surface 1121 and the image-side surface 1122 of the second lens element 1120 are aspheric.

The third lens element 1130 with negative refractive power has a convex object-side surface 1131 and a concave image-side surface 1132, and is made of plastic material. The object-side surface 1131 and the image-side surface 1132 of the third lens element 1130 are aspheric. Moreover, the third lens element 1130 has inflection points formed on the object-side surface 1131 and the image-side surface 1132 thereof.

The fourth lens element 1140 with positive refractive power has a concave object-side surface 1141 and a convex image-side surface 1142, and is made of plastic material. The object-side surface 1141 and the image-side surface 1142 of the fourth lens element 1140 are aspheric. Moreover, the fourth lens element 1140 has inflection points formed on the object-side surface 1141 and the image-side surface 1142 thereof. Additionally, the positive refractive power of the fourth lens element 1140 decreases when moving away from the optical axis.

The fifth lens element 1150 with negative refractive power has a convex object-side surface 1151 and a concave image-side surface 1152, and is made of plastic material. The object-side surface 1151 and the image-side surface 1152 of the fifth lens element 1150 are aspheric. Moreover, the fifth lens element 1150 has inflection points formed on the object-side surface 1151 and the image-side surface 1152 thereof. Additionally, the negative refractive power of the fifth lens element 1150 decreases when moving away from the optical axis.

The IR cut filter 1170 is made of glass and located between the fifth lens element 1150 and the image plane 1160, and will not affect the focal length of the image lens assembly.

The detailed optical data of the 11th embodiment are shown in Table 21 and the aspheric surface data are shown in Table 22 below.

TABLE 21

11th Embodiment
f = 2.88 mm, Fno = 2.10, HFOV = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.702060 (ASP) | 0.544 | Plastic | 1.544 | 55.9 | 2.69 |
| 2 | | −9.300000 (ASP) | 0.070 | | | | |
| 3 | Ape. Stop | Plano | 0.070 | | | | |
| 4 | Lens 2 | −4.394300 (ASP) | 0.250 | Plastic | 1.640 | 23.3 | −8.68 |
| 5 | | −21.564100 (ASP) | 0.181 | | | | |
| 6 | Lens 3 | 13.252900 (ASP) | 0.266 | Plastic | 1.640 | 23.3 | −9.41 |
| 7 | | 4.107100 (ASP) | 0.166 | | | | |
| 8 | Lens 4 | −2.398450 (ASP) | 0.741 | Plastic | 1.544 | 55.9 | 1.56 |
| 9 | | −0.694400 (ASP) | 0.271 | | | | |
| 10 | Lens 5 | 15.327400 (ASP) | 0.320 | Plastic | 1.544 | 55.9 | −1.80 |
| 11 | | 0.911860 (ASP) | 0.600 | | | | |
| 12 | IR-Filter | Plano | 0.210 | Glass | 1.517 | 64.2 | — |
| 13 | | Plano | 0.384 | | | | |
| 14 | Image | Plano | — | | | | |

Note:
Reference wavelength (d-line) is 587.6 nm.

TABLE 22

Aspheric Coefficients

| Surface # | 1 | 2 | 4 | 5 | 6 |
|---|---|---|---|---|---|
| k = | −1.74813E+01 | 3.96280E+01 | −7.98755E+01 | 6.01826E+01 | −2.24526E+01 |
| A4 = | 3.70775E−01 | 5.80779E−02 | 8.85667E−02 | 2.49009E−03 | −6.63410E−01 |
| A6 = | −6.62183E−01 | −1.16752E−01 | −1.96651E−01 | −5.62739E−01 | 6.16472E−01 |
| A8 = | 8.13878E−01 | −3.83223E−01 | 6.82721E−01 | 1.47589E+00 | −5.68899E+00 |
| A10 = | −5.38015E−01 | 1.60306E+00 | −2.11159E+00 | −1.76405E+00 | 1.46955E+01 |
| A12 = | −1.09322E−01 | −2.45244E+00 | 5.18913E+00 | 2.95508E+00 | −9.86865E+00 |
| A14 = | 1.95792E−01 | 1.41639E+00 | −4.51671E+00 | −1.14527E+00 | |

| Surface # | 7 | 8 | 9 | 10 | 11 |
|---|---|---|---|---|---|
| k = | 2.04883E+00 | −1.73575E+01 | −3.01466E+00 | −9.29334E−01 | −6.33128E+00 |
| A4 = | −3.53352E−01 | −1.84682E−01 | −3.76926E−01 | −2.52764E−01 | −2.04917E−01 |
| A6 = | 7.28882E−01 | 8.81343E−01 | 4.47578E−01 | 1.56983E−01 | 1.51855E−01 |
| A8 = | −3.13024E+00 | −1.44652E+00 | −4.80850E−01 | −2.74686E−02 | −8.52143E−02 |
| A10 = | 7.67910E+00 | 1.19720E+00 | 4.87654E−01 | −3.85036E−02 | 2.87584E−02 |
| A12 = | −1.00295E+01 | −3.86677E−01 | −1.65989E−01 | 2.50084E−02 | −5.55777E−03 |
| A14 = | 6.92624E+00 | −4.07867E−02 | | −4.23134E−03 | 4.69176E−04 |
| A16 = | −2.06552E+00 | | | | |

In the image lens assembly according to the 11th embodiment, the definitions of f, FOV, V1, V2, EPD, CT2, CT3, SL, TTL and ImgH are the same as those stated in the 1st embodiment with corresponding values for the 11th embodiment. Moreover, these parameters can be calculated from Table 21 and Table 22 as the following values and satisfy the following relationships:

| | |
|---|---|
| f (mm) | 2.88 |
| FOV (deg.) | 75.4 |
| V1 − V2 | 32.6 |
| f/EPD | 2.10 |
| EPD/CT2 | 5.49 |
| CT2/CT3 | 0.94 |
| SL/TTL | 0.85 |
| TTL/ImgH | 1.76 |

12th Embodiment

Figure 23:
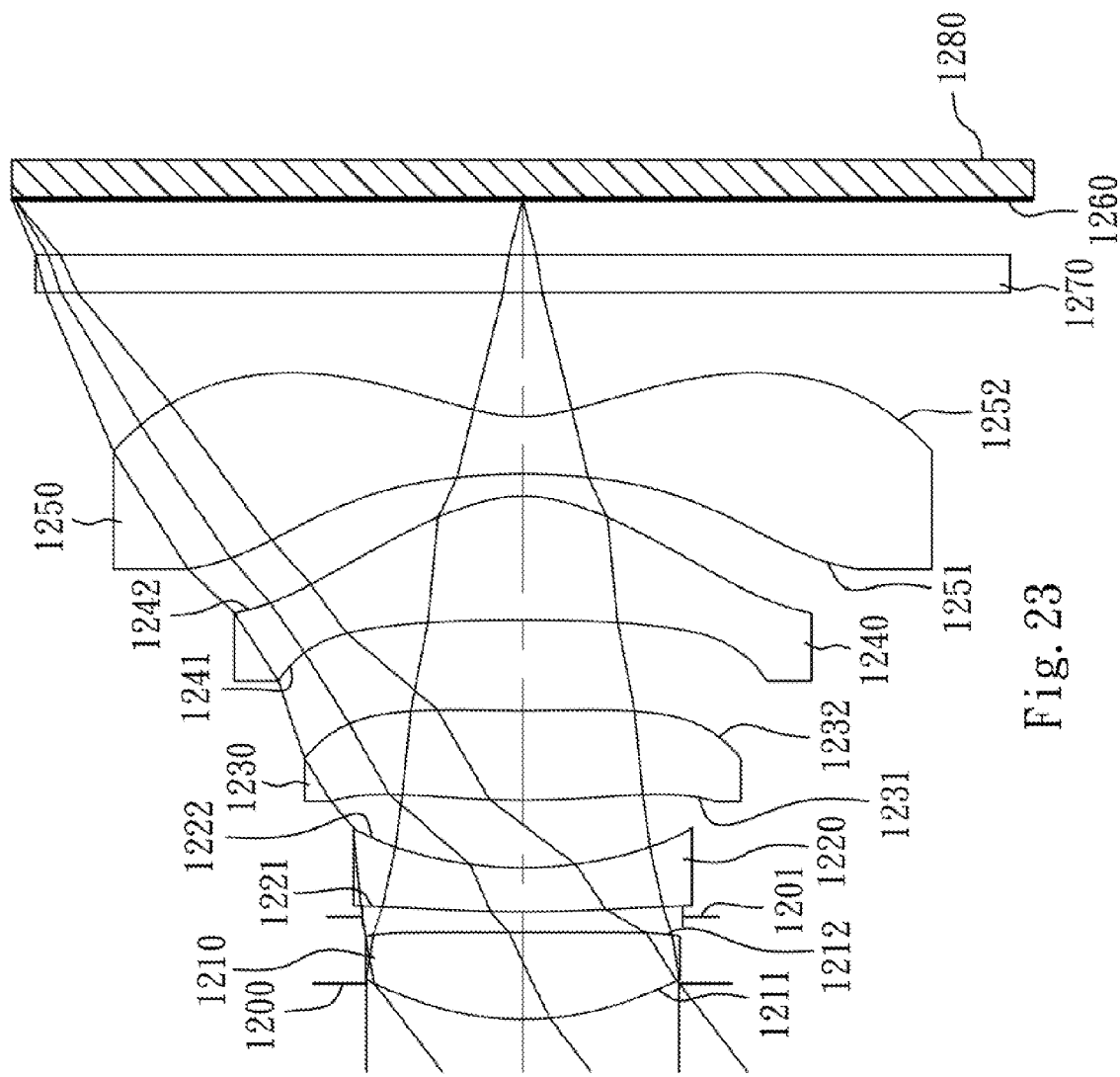
FIG. 23 is a schematic view of an image lens assembly according to the 12th embodiment of the present disclosure.
Figure 24:
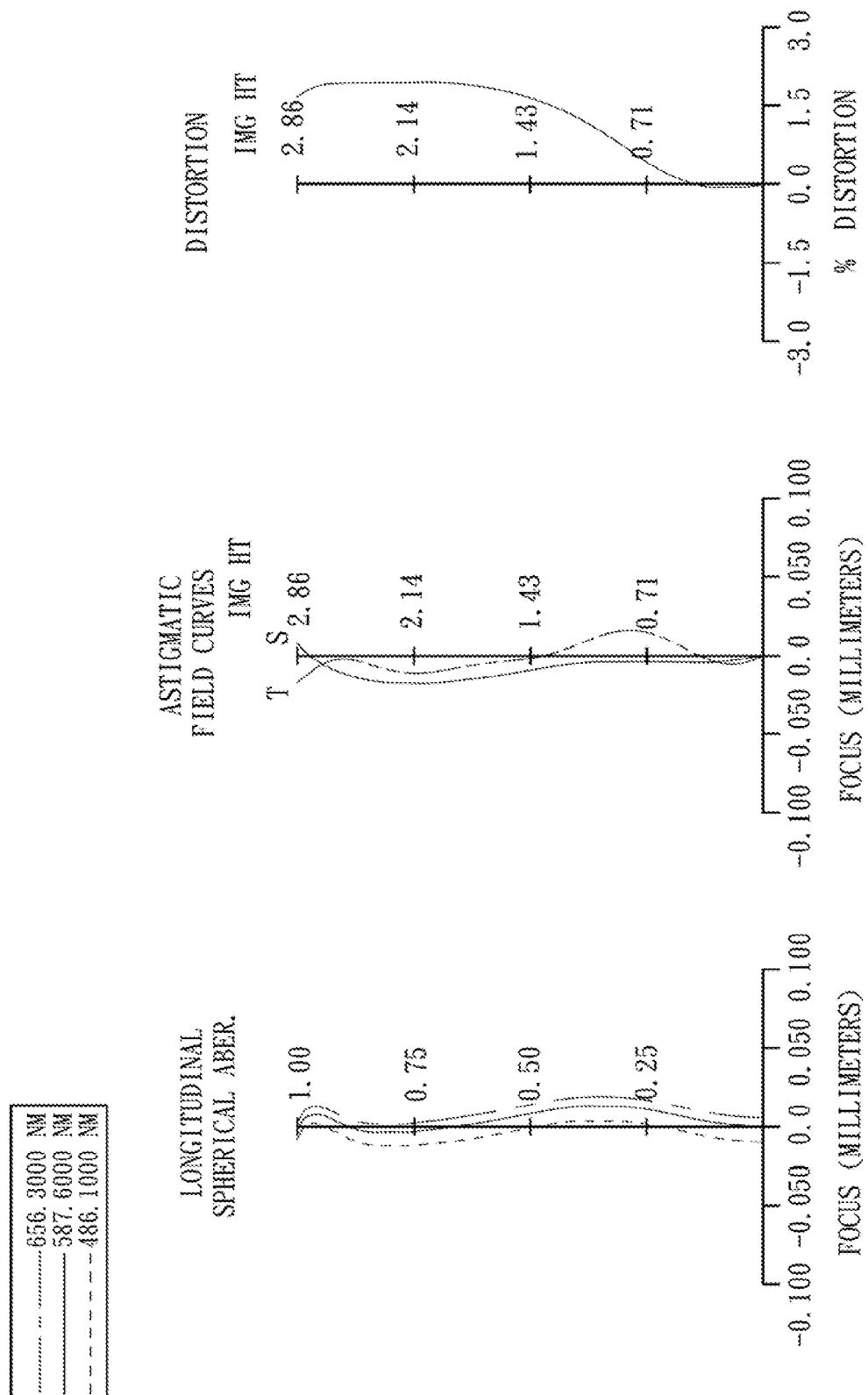
FIG. 24 shows spherical aberration curves, astigmatic field curves and a distortion curve of the image lens assembly according to the 12th embodiment.

FIG. 23 is a schematic view of an image lens assembly according to the 12th embodiment of the present disclosure. FIG. 24 shows spherical aberration curves, astigmatic field curves and a distortion curve of the image lens assembly according to the 12th embodiment. In FIG. 23, the image lens assembly includes, in order from an object side to an image side, an aperture stop 1200, the first lens element 1210, a stop 1201, the second lens element 1220, the third lens element 1230, the fourth lens element 1240, the fifth lens element 1250, an IR cut filter 1270, an image plane 1260 and an image sensor 1280.

The first lens element 1210 with positive refractive power has a convex object-side surface 1211 and a concave image-side 1212, and is made of plastic material. The object-side surface 1211 and the image-side 1212 of the first lens element 1210 are aspheric.

The second lens element 1220 with negative refractive power has a convex object-side surface 1221 and a concave image-side surface 1222, and is made of plastic material. The object-side surface 1221 and the image-side surface 1222 of the second lens element 1220 are aspheric.

The third lens element 1230 with positive refractive power has a convex object-side surface 1231 and a concave image-side surface 1232, and is made of plastic material. The object-side surface 1231 and the image-side surface 1232 of the third lens element 1230 are aspheric. Moreover, the third lens element 1230 has inflection points formed on the object-side surface 1231 and the image-side surface 1232 thereof.

The fourth lens element 1240 with positive refractive power has a concave object-side surface 1241 and a convex image-side surface 1242, and is made of plastic material. The object-side surface 1241 and the image-side surface 1242 of the fourth lens element 1240 are aspheric. Moreover, the fourth lens element 1240 has inflection points formed on the image-side surface 1242 thereof. Additionally, the positive refractive power of the fourth lens element 1240 decreases when moving away from the optical axis.

The fifth lens element 1250 with negative refractive power has a concave object-side surface 1251 and a concave image-side surface 1252, and is made of plastic material. The object-side surface 1251 and the image-side surface 1252 of the fifth lens element 1250 are aspheric. Moreover, the fifth lens element 1250 has inflection points formed on the object-side surface 1251 and the image-side surface 1252 thereof. Additionally, the negative refractive power of the fifth lens element 1250 decreases when moving away from the optical axis.

The IR cut filter 1270 is made of glass and located between the fifth lens element 1250 and the image plane 1260, and will not affect the focal length of the image lens assembly.

The detailed optical data of the 12th embodiment are shown in Table 23 and the aspheric surface data are shown in Table 24 below.

TABLE 23

12th Embodiment
f = 3.65 mm, Fno = 2.08, HFOV = 37.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.204 | | | | |
| 2 | Lens 1 | 1.744360 (ASP) | 0.488 | Plastic | 1.544 | 55.9 | 3.26 |
| 3 | | 100.000000 (ASP) | 0.088 | | | | |
| 4 | Stop | Plano | 0.028 | | | | |
| 5 | Lens 2 | 6.463400 (ASP) | 0.250 | Plastic | 1.634 | 23.8 | −4.85 |
| 6 | | 2.052590 (ASP) | 0.377 | | | | |
| 7 | Lens 3 | 4.374500 (ASP) | 0.507 | Plastic | 1.544 | 55.9 | 11.19 |
| 8 | | 14.903300 (ASP) | 0.509 | | | | |
| 9 | Lens 4 | −16.460900 (ASP) | 0.697 | Plastic | 1.544 | 55.9 | 1.45 |
| 10 | | −0.763020 (ASP) | 0.124 | | | | |
| 11 | Lens 5 | −3.291700 (ASP) | 0.320 | Plastic | 1.535 | 56.3 | −1.25 |
| 12 | | 0.867480 (ASP) | 0.700 | | | | |
| 13 | IR-Filter | Plano | 0.210 | Glass | 1.517 | 64.2 | — |
| 14 | | Plano | 0.313 | | | | |
| 15 | Image | Plano | — | | | | |

Note:
Reference wavelength (d-line) is 587.6 nm.
Effective radius of the Surface 4 is 0.90 mm.

TABLE 24

| Aspheric Coefficients | | | | | |
|---|---|---|---|---|---|
| Surface # | 2 | 3 | 5 | 6 | 7 |
| k = | 7.50319E−01 | −1.00000E+00 | 9.28883E−02 | 1.07443E+00 | −8.80846E+01 |
| A4 = | −2.47056E−02 | −3.83499E−02 | −1.41993E−01 | −1.52433E−01 | −3.16043E−03 |
| A6 = | 1.30719E−02 | 9.28313E−02 | 3.53848E−01 | 2.99523E−01 | −9.23904E−02 |
| A8 = | −8.92744E−02 | −1.04061E−01 | −4.53164E−01 | −2.96970E−01 | 4.68151E−02 |
| A10 = | 9.63043E−02 | −1.52804E−01 | 1.31614E−01 | 6.19993E−02 | 5.19770E−02 |
| A12 = | −4.15706E−02 | 3.03426E−01 | 1.84925E−01 | 1.20150E−01 | −9.34790E−02 |
| A14 = | −3.52843E−02 | −1.76062E−01 | −1.21399E−01 | −6.53581E−02 | 3.59738E−02 |
| Surface # | 8 | 9 | 10 | 11 | 12 |
| k = | −1.00000E+00 | −1.00000E+00 | −4.32106E+00 | −6.23005E+01 | −7.12530E+00 |
| A4 = | −1.19025E−01 | −9.51400E−02 | −8.62573E−02 | −1.04548E−01 | −9.17438E−02 |
| A6 = | 8.43335E−02 | 1.36125E−01 | 8.12196E−02 | 4.04467E−03 | 3.38576E−02 |
| A8 = | −1.80440E−01 | −1.43875E−01 | −3.23427E−02 | 1.80733E−02 | −9.47795E−03 |
| A10 = | 1.55508E−01 | 7.60640E−02 | 7.90923E−03 | −5.81051E−03 | 1.56106E−03 |
| A12 = | −7.19459E−02 | −2.66438E−02 | −1.04248E−03 | 7.04785E−04 | −1.40695E−04 |
| A14 = | 1.24961E−02 | 4.01959E−03 | 5.57297E−05 | −2.99369E−05 | 5.16127E−06 |

In the image lens assembly according to the 12th embodiment, the definitions of f, FOV, V1, V2, EPD, CT2, CT3, SL, TTL and ImgH are the same as those stated in the 1st embodiment with corresponding values for the 12th embodiment. Moreover, these parameters can be calculated from Table 23 and Table 24 as the following values and satisfy the following relationships:

| | |
|---|---|
| f (mm) | 3.65 |
| FOV (deg.) | 75.2 |
| V1 − V2 | 32.1 |
| f/EPD | 2.08 |
| EPD/CT2 | 7.03 |
| CT2/CT3 | 0.49 |
| SL/TTL | 0.96 |
| TTL/ImgH | 1.59 |

13th Embodiment

Figure 25:
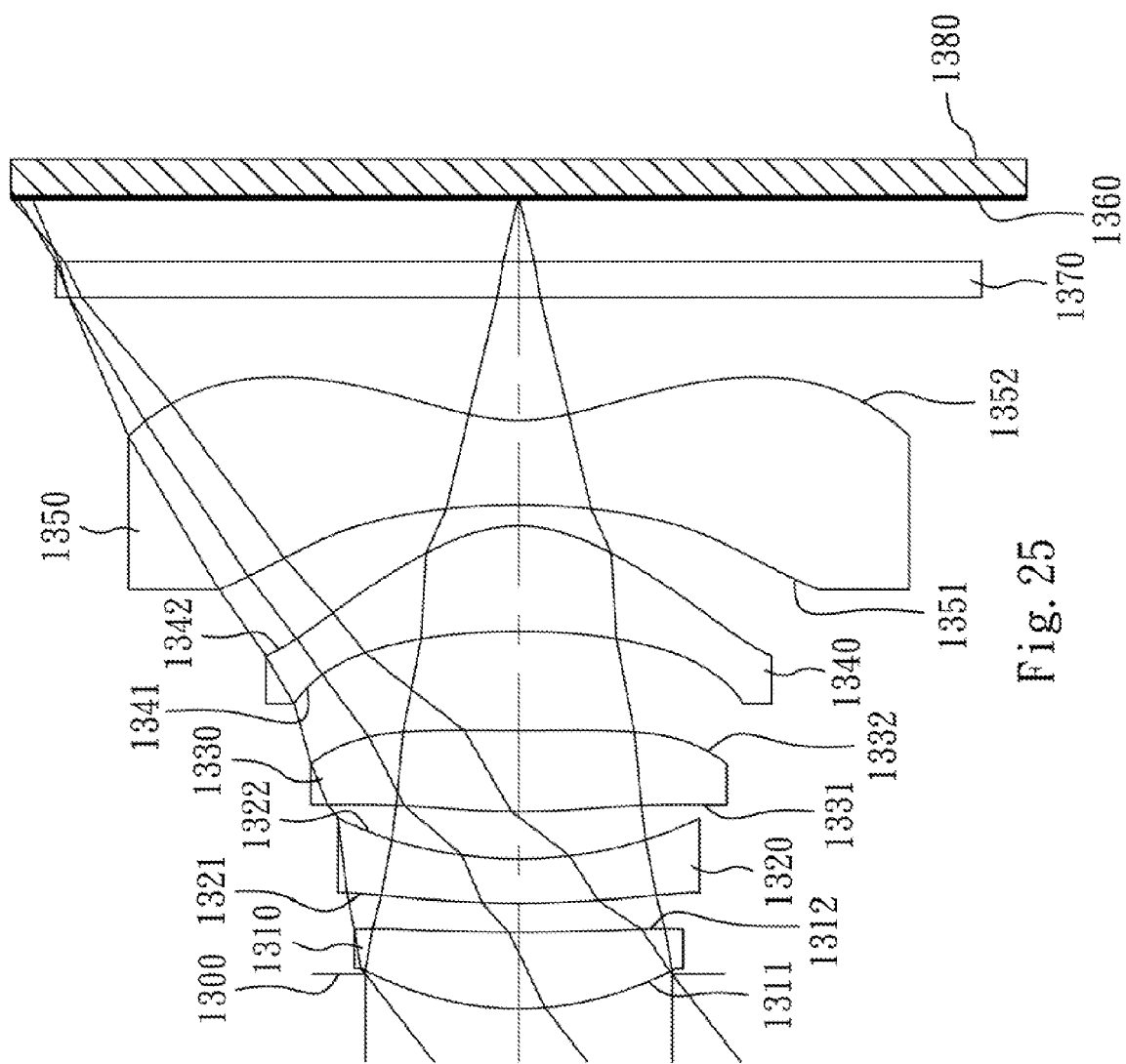
FIG. 25 is a schematic view of an image lens assembly according to the 13th embodiment of the present disclosure.
Figure 26:
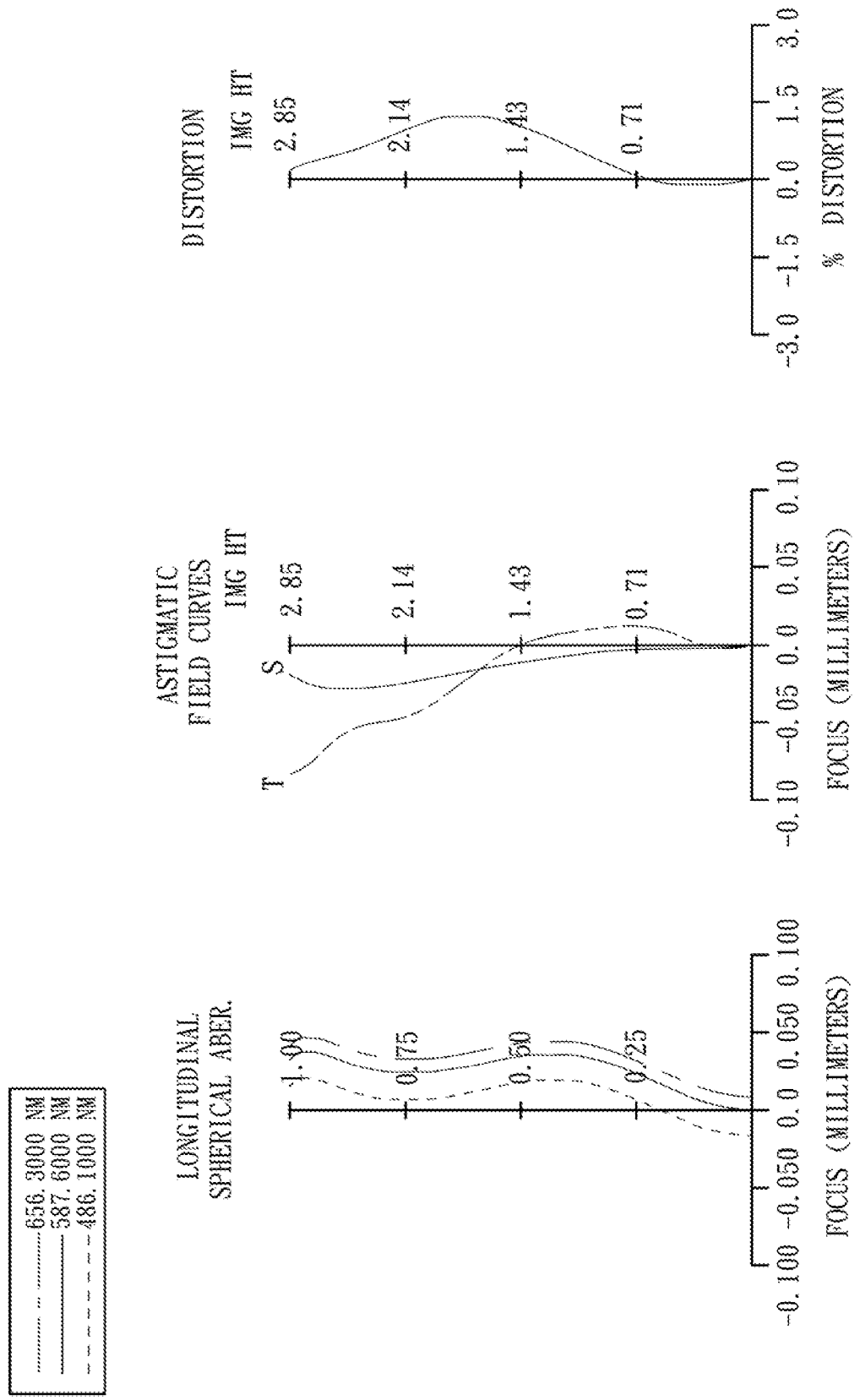
FIG. 26 shows spherical aberration curves, astigmatic field curves and a distortion curve of the image lens assembly according to the 13th embodiment.

FIG. 25 is a schematic view of an image lens assembly according to the 13th embodiment of the present disclosure. FIG. 26 shows spherical aberration curves, astigmatic field curves and a distortion curve of the image lens assembly according to the 13th embodiment. In FIG. 25, the image lens assembly includes, in order from an object side to an image side, an aperture stop 1300, the first lens element 1310, the second lens element 1320, the third lens element 1330, the fourth lens element 1340, the fifth lens element 1350, an IR cut filter 1370, an image plane 1360 and an image sensor 1380.

The first lens element 1310 with positive refractive power has a convex object-side surface 1311 and a concave image-side surface 1312, and is made of plastic material. The object-side surface 1311 and the image-side surface 1312 of the first lens element 1310 are aspheric.

The second lens element 1320 with negative refractive power has a convex object-side surface 1321 and a concave image-side surface 1322, and is made of plastic material. The object-side surface 1321 and the image-side surface 1322 of the second lens element 1320 are aspheric.

The third lens element 1330 with positive refractive power has a convex object-side surface 1331 and a concave image-side surface 1332, and is made of plastic material. The object-side surface 1331 and the image-side surface 1332 of the third lens element 1330 are aspheric. Moreover, the third lens element 1330 has inflection points formed on the object-side surface 1331 and the image-side surface 1332 thereof.

The fourth lens element 1340 with positive refractive power has a concave object-side surface 1341 and a convex image-side surface 1342, and is made of plastic material. The object-side surface 1341 and the image-side surface 1342 of the fourth lens element 1340 are aspheric. Moreover, the fourth lens element 1340 has inflection points formed on the image-side surface 1342 thereof. Additionally, the positive refractive power of the fourth lens element 1340 decreases when moving away from the optical axis.

The fifth lens element 1350 with negative refractive power has a concave object-side surface 1351 and a concave image-side surface 1352, and is made of plastic material. The object-side surface 1351 and the image-side surface 1352 of the fifth lens element 1350 are aspheric. Moreover, the fifth lens element 1350 has inflection points formed on the object-side surface 1351 and the image-side surface 1352 thereof. Additionally, the negative refractive power of the fifth lens element 1350 decreases when moving away from the optical axis.

The IR cut filter 1370 is made of glass and located between the fifth lens element 1350 and the image plane 1360, and will not affect the focal length of the image lens assembly.

The detailed optical data of the 13th embodiment are shown in Table 25 and the aspheric surface data are shown in Table 26 below.)

TABLE 25

13th Embodiment
f = 3.63 mm, Fno = 2.08, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.197 | | | | |
| 2 | Lens 1 | 1.796710 (ASP) | 0.439 | Plastic | 1.544 | 55.9 | 3.87 |
| 3 | | 11.149600 (ASP) | 0.164 | | | | |
| 4 | Lens 2 | 4.850300 (ASP) | 0.250 | Plastic | 1.634 | 23.8 | −6.23 |
| 5 | | 2.133880 (ASP) | 0.273 | | | | |
| 6 | Lens 3 | 3.994700 (ASP) | 0.459 | Plastic | 1.544 | 55.9 | 8.47 |
| 7 | | 28.667700 (ASP) | 0.565 | | | | |
| 8 | Lens 4 | −4.224600 (ASP) | 0.602 | Plastic | 1.544 | 55.9 | 1.63 |
| 9 | | −0.770020 (ASP) | 0.120 | | | | |
| 10 | Lens 5 | −3.588400 (ASP) | 0.481 | Plastic | 1.535 | 56.3 | −1.40 |
| 11 | | 0.986040 (ASP) | 0.700 | | | | |
| 12 | IR-Filter | Plano | 0.210 | Glass | 1.517 | 64.2 | — |
| 13 | | Plano | 0.360 | | | | |
| 14 | Image | Plano | — | | | | |

Note:
Reference wavelength (d-line) is 587.6 nm.

TABLE 26

Aspheric Coefficients

| Surface # | 2 | 3 | 4 | 5 | 6 |
|---|---|---|---|---|---|
| k = | 7.02060E−01 | −1.00000E+00 | −1.18173E+00 | 9.43766E−01 | −1.13342E+01 |
| A4 = | −3.35138E−02 | −4.09218E−02 | −1.54228E−01 | −1.82302E−01 | −1.12473E−01 |
| A6 = | 4.84306E−02 | 6.67691E−02 | 3.23350E−01 | 3.04325E−01 | 1.06037E−01 |
| A8 = | −1.33634E−01 | −4.94156E−02 | −3.81830E−01 | −2.39025E−01 | −1.89577E−01 |
| A10 = | 1.33621E−01 | −1.21779E−01 | 2.02706E−01 | 4.33557E−02 | 2.00990E−01 |
| A12 = | −6.59070E−02 | 2.47219E−01 | 2.36016E−02 | 7.37015E−02 | −8.75829E−02 |
| A14 = | 2.29124E−04 | −1.43344E−01 | −5.96943E−02 | −4.46568E−02 | 1.24009E−02 |

| Surface # | 7 | 8 | 9 | 10 | 11 |
|---|---|---|---|---|---|
| k = | −1.00000E+00 | −1.00000E+00 | −3.55942E+00 | −3.50150E+01 | −8.04447E+00 |
| A4 = | −7.79088E−02 | −6.82607E−02 | −1.13586E−01 | −3.86158E−02 | −6.24409E−02 |
| A6 = | −1.20450E−03 | 3.89483E−02 | 7.60588E−02 | −3.41938E−02 | 1.71128E−02 |
| A8 = | −1.91370E−02 | −1.52843E−02 | −3.65916E−02 | 2.35716E−02 | −4.26117E−03 |
| A10 = | −1.33564E−02 | −9.32455E−03 | 1.73638E−02 | −4.73971E−03 | 5.65201E−04 |
| A12 = | 1.34586E−02 | 4.17102E−04 | −4.35450E−03 | 3.09165E−04 | −3.05712E−05 |
| A14 = | −1.12414E−03 | 2.55788E−04 | 4.49070E−04 | 2.80743E−06 | −2.10732E−07 |

In the image lens assembly according to the 13th embodiment, the definitions of f, FOV, V1, V2, EPD, CT2, CT3, SL, TTL and ImgH are the same as those stated in the 1st embodiment with corresponding values for the 13th embodiment. Moreover, these parameters can be calculated from Table 25 and Table 26 as the following values and satisfy the following relationships:

| | |
|---|---|
| f (mm) | 3.63 |
| FOV (deg.) | 76.0 |
| V1 − V2 | 32.1 |
| f/EPD | 2.08 |
| EPD/CT2 | 6.39 |
| CT2/CT3 | 0.54 |
| SL/TTL | 0.96 |
| TTL/ImgH | 1.59 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image lens assembly comprising, in order from an object side to an image side:
    a first lens element with positive refractive power having a convex object-side surface;
    a second lens element with negative refractive power;
    a third lens element with refractive power having a concave image-side surface, wherein at least one surface of an object-side surface and the image-side surface of the third lens element is aspheric;
    a fourth lens element with positive refractive power made of plastic material, wherein at least one surface of an object-side surface and an image-side surface of the fourth lens element is aspheric; and
    a fifth lens element with negative refractive power made of plastic material and having a concave image-side surface, wherein at least one surface of an object-side surface and the image-side surface of the fifth lens element is aspheric, and the fifth lens element has at least one inflection point formed on the image-side surface thereof;

wherein a focal length of the image lens assembly is f, and a diameter of an entrance pupil of the image lens assembly is EPD, the following relationship is satisfied:

$1.4 < f/EPD \leq 1.9$.

2. The image lens assembly of claim 1, wherein the fourth lens element has a convex image-side surface.

3. The image lens assembly of claim 2, wherein the second lens element has a concave image-side surface, and the fourth lens element has a concave object-side surface.

4. The image lens assembly of claim 3, wherein the positive refractive power of the fourth lens element decreases when moving away from the optical axis, and the negative refractive power of the fifth lens element decreases when moving away from the optical axis.

5. The image lens assembly of claim 2, wherein the third lens element with positive refractive power has a convex object-side surface and has at least one inflection point formed on at least one of the object-side surface and the image-side surface thereof.

6. The image lens assembly of claim 2, further comprising:
a stop, wherein an axial distance between the stop and an image plane is SL, and an axial distance between the object-side surface of the first lens element and the image plane is TTL, the following relationship is satisfied:

$0.76 < SL/TTL < 1$.

7. The image lens assembly of claim 2, wherein a central thickness of the second lens element is CT2, and a central thickness of the third lens element is CT3, the following relationship is satisfied:

$0.1 < CT2/CT3 < 0.76$.

8. The image lens assembly of claim 1, wherein the Abbe number of the first lens element is V1, and the Abbe number of the second lens element is V2, the following relationship is satisfied:

$28 < V1-V2 < 45$.

9. The image lens assembly of claim 1, wherein the focal length of the image lens assembly is f, and the diameter of the entrance pupil of the image lens assembly is EPD, the following relationship is satisfied:

$1.4 < f/EPD \leq 1.85$.

10. The image lens assembly of claim 9, wherein the focal length of the image lens assembly is f, and the diameter of the entrance pupil of the image lens assembly is EPD, the following relationship is satisfied:

$1.4 < f/EPD \leq 1.75$.

11. The image lens assembly of claim 1, wherein the diameter of the entrance pupil of the image lens assembly is EPD, and the central thickness of the second lens element is CT2, the following relationship is satisfied:

$6.0 < EPD/CT2 < 9.5$.

12. The image lens assembly of claim 1, wherein a maximum image height of the image lens assembly is ImgH, and an axial distance between the object-side surface of the first lens element and the image plane is TTL, the following relationships is satisfied:

$TTL/ImgH < 2.0$.

13. An image lens assembly comprising, in order from an object side to an image side:
a first lens element with positive refractive power has a convex object-side surface;
a second lens element with negative refractive power;
a third lens element with positive refractive power, wherein at least one surface of an object-side surface and an image-side surface of the third lens element is aspheric;
a fourth lens element with refractive power made of plastic material, wherein at least one surface of an object-side surface and an image-side surface of the fourth lens element is aspheric; and
a fifth lens element with refractive power made of plastic material and having a concave image-side surface, wherein at least one surface of an object-side surface and the image-side surface of the fifth lens element is aspheric, and the fifth lens element has at least one inflection point formed on at least one surface thereof;
wherein a central thickness of the fourth lens element is greater than a central thickness of the third lens element, a diameter of an entrance pupil of the image lens assembly is EPD, a central thickness of the second lens element is CT2, a focal length of the image lens assembly is f, and a maximal field of view of the Image lens assembly is FOV, the following relationships are satisfied:

$6.0 < EPD/CT2 < 9.5$;

$f/EPD \leq 1.94$; and $74.0 \text{ (degree)} \leq FOV$.

14. The image lens assembly of claim 13, wherein the fourth lens element has positive refractive power, and the fifth lens element has negative refractive power.

15. The image lens assembly of claim 13, wherein the focal length of the image lens assembly is f, and the diameter of the entrance pupil of the image lens assembly is EPD, the following relationship is satisfied:

$1.4 < f/EPD \leq 1.85$.

16. The image lens assembly of claim 14, wherein the Abbe number of the first lens element is V1, and the Abbe number of the second lens element is V2, the following relationship is satisfied:

$28 < V1-V2 < 45$.

17. The image lens assembly of claim 14, wherein the second lens element has a concave image-side surface, and the third lens element has at least one inflection point formed on at least one surface thereof.

18. The image lens assembly of claim 14, wherein the positive refractive power of the fourth lens element decreases when moving away from the optical axis, and the negative refractive power of the fifth lens element decreases when moving away from the optical axis.

19. The image lens assembly of claim 14, further comprising:
a stop, wherein an axial distance between the stop and an image plane is SL, and an axial distance between the object-side surface of the first lens element and the image plane is TTL, a maximum image height of the image lens assembly is ImgH, the following relationships are satisfied:

$0.76 < SL/TTL < 1.1$; and $TTL/ImgH < 2.0$.

20. An image lens assembly comprising, in order from an object side to an image side:
- a first lens element with positive refractive power has a convex object-side surface;
- a second lens element with negative refractive power;
- a third lens element with refractive power, wherein at least one surface of an object-side surface and an image-side surface of the third lens element is aspheric;
- a fourth lens element with refractive power made of plastic material, wherein at least one surface of an object-side surface and an image-side surface of the fourth lens element is aspheric; and
- a fifth lens element with refractive power made of plastic material, and having a convex object-side surface and a concave image-side surface, wherein at least one surface of the object-side surface and the image-side surface of the fifth lens element is aspheric, and the fifth lens element has at least one inflection point formed on at least one surface thereof;
- wherein a focal length of the image lens assembly is f, and a diameter of an entrance pupil of the image lens assembly is EPD, the following relationship is satisfied:

$f/EPD \leq 1.94.$

21. The image lens assembly of claim 20, wherein the image-side surface of the fourth lens element is convex.

22. The image lens assembly of claim 20, wherein the image-side surface of the third lens element is concave.

23. The image lens assembly of claim 20, wherein the fourth lens element has positive refractive power and the fifth lens element has negative refractive power, wherein the positive refractive power of the fourth lens element decreases when moving away from the optical axis, and the negative refractive power of the fifth lens element decreases when moving away from the optical axis.

24. The image lens assembly of claim 20, further comprising:
- a stop, wherein an axial distance between the stop and an image plane is SL, an axial distance between the object-side surface of the first lens element and the image plane is TTL, and a maximum image height of the image lens assembly is ImgH, the following relationships are satisfied:

$0.76 < SL/TTL < 1.1;$ and $TTL/ImgH < 2.0.$

25. The image lens assembly of claim 20, wherein the Abbe number of the first lens element is V1, and the Abbe number of the second lens element is V2, the following relationship is satisfied:

$28 < V1 - V2 < 45.$

26. The image lens assembly of claim 20, wherein the focal length of the image lens assembly is f, and the diameter of the entrance pupil of the image lens assembly is EPD, the following relationship is satisfied:

$1.4 < f/EPD \leq 1.9.$

27. The image lens assembly of claim 26, wherein the focal length of the image lens assembly is f, and the diameter of the entrance pupil of the image lens assembly is EPD, the following relationship is satisfied:

$1.4 < f/EPD \leq 1.85.$

28. The image lens assembly of claim 20, wherein the third lens element has positive refractive power, and a central thickness of the fourth lens element is greater than a central thickness of the third lens element.

29. The image lens assembly of claim 20, wherein a maximal field of view of the image lens assembly is FOV, the following relationship is satisfied:

$74.0 \text{ (degree)} \leq FOV.$

* * * * *